(12) United States Patent
Mestre

(10) Patent No.: US 9,584,641 B2
(45) Date of Patent: *Feb. 28, 2017

(54) MESSAGING DEVICE

(71) Applicant: Jorge Mestre, Boston, MA (US)

(72) Inventor: Jorge Mestre, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,680

(22) Filed: Sep. 7, 2016

(65) Prior Publication Data

US 2016/0381195 A1     Dec. 29, 2016

Related U.S. Application Data

(63) Continuation of application No. 13/795,480, filed on Mar. 12, 2013, now Pat. No. 9,465,520.

(60) Provisional application No. 61/641,094, filed on May 1, 2012.

(51) Int. Cl.

| | |
|---|---|
| *G06F 3/0484* | (2013.01) |
| *H04M 1/22* | (2006.01) |
| *H04M 1/725* | (2006.01) |
| *H04W 4/00* | (2009.01) |
| *H04L 12/58* | (2006.01) |

(52) U.S. Cl.
CPC .............. *H04M 1/22* (2013.01); *H04L 51/18* (2013.01); *H04M 1/7253* (2013.01); *H04W 4/003* (2013.01)

(58) Field of Classification Search
CPC ... G06F 3/00; G06F 3/03; G06F 3/048; G06F 3/0481; G06F 3/0482; G06F 3/0484; G06F 9/4443; G06F 1/165; G06F 1/1647; G06F 1/1613; G06F 1/1626; G06F 15/16; G06F 17/00; H05B 37/00; H05B 37/02; G08B 3/00; G08B 5/00; G08B 5/36; G08B 7/00; G08B 13/00; G08B 19/00; G09G 3/22; G09G 3/30; G09G 3/32; H04W 4/12; H04W 68/00
See application file for complete search history.

(56) References Cited

U.S. PATENT DOCUMENTS

| | | |
|---|---|---|
| 4,458,434 A | 7/1984 | Ackeret |
| 4,691,456 A | 9/1987 | Ackeret |
| 6,578,982 B1 | 6/2003 | Lynch |
| 6,611,244 B1 | 8/2003 | Guritz |
| 7,064,673 B1 | 6/2006 | Bonham |

(Continued)

OTHER PUBLICATIONS

Hallmark Text Bands 1 Bump Fists_Send Text Band 2 Band_www.textbands.com_Apr. 8, 2013_2 pages.

(Continued)

*Primary Examiner* — Xiomar L Bautista
(74) *Attorney, Agent, or Firm* — Foley & Lardner LLP; James De Vellis

(57) ABSTRACT

A portable messaging device is provided that can display visual messages and communicate with additional messaging devices via a local area network. The portable messaging device can include a display panel having an LED array, and a control unit. Lateral side walls, and the inner surface of the display panel can define at least part of a recessed opening configured to receive an electronic device such as a smartphone. The control unit can receive input via a user interface of the portable messaging device and, responsive to the input, provide a visual message to the LED array for display from the outer surface of the display panel.

20 Claims, 19 Drawing Sheets

(56) References Cited

U.S. PATENT DOCUMENTS

| | | |
|---|---|---|
| D525,986 S | 8/2006 | Kim |
| 7,347,325 B2 | 3/2008 | O'Neill et al. |
| 7,782,610 B2 | 8/2010 | Diebel et al. |
| 7,844,310 B2 | 11/2010 | Anderson |
| 7,982,698 B2 | 7/2011 | Moulis, Jr. et al. |
| D656,929 S | 4/2012 | Hsiung |
| D684,150 S | 6/2013 | Goradesky et al. |
| D691,656 S | 10/2013 | Merrill et al. |
| D694,226 S | 11/2013 | Thompson et al. |
| D697,503 S | 1/2014 | Melanson et al. |
| D698,774 S | 2/2014 | Wardy |
| 2002/0080012 A1 | 6/2002 | Broderick |
| 2005/0000126 A1 | 1/2005 | Gray et al. |
| 2006/0192684 A1 | 8/2006 | Kaoh |
| 2006/0210023 A1 | 9/2006 | Spruce |
| 2007/0144047 A1 | 6/2007 | Singh |
| 2007/0194066 A1 | 8/2007 | Ishihara et al. |
| 2008/0024961 A1 | 1/2008 | Anderson et al. |
| 2009/0241243 A1 | 10/2009 | Ritter |
| 2009/0254623 A1 | 10/2009 | Hones et al. |
| 2010/0210290 A1 | 8/2010 | Riley et al. |
| 2011/0195753 A1 | 8/2011 | Mock et al. |
| 2012/0194448 A1 | 8/2012 | Rothkopf |
| 2012/0302294 A1 | 11/2012 | Hammond et al. |
| 2013/0088410 A1 | 4/2013 | Hill et al. |
| 2013/0222231 A1 | 8/2013 | Gardenfors et al. |
| 2013/0225127 A1 | 8/2013 | Cavacuiti et al. |
| 2013/0281169 A1 | 10/2013 | Coverstone et al. |
| 2014/0159867 A1 | 6/2014 | Sartee et al. |

OTHER PUBLICATIONS

Kinney, Chance, Endliss Smartcase Has LED Display for Texts, Calls, and Notifications, www.chipchick.com_2013_01_endliss-smartcase.html_Jan. 7, 2013_4pages.

Notice of Allowance for U.S. Appl. No. 29/419,766 dated Jul. 22, 2014.

Notice of Allowance for U.S. Appl. No. 29/419,766 dated Oct. 29, 2014.

Notice of Allowance for U.S. Appl. No. 13/795,480 dated Jun. 17, 2016.

Office Action on U.S. Appl. No. 13/795,480 dated Dec. 8, 2015.

Office Action on U.S. Appl. No. 13/795,480 dated Mar. 14, 2016.

Time Magazine, "Pop Chart, The Culture, WTF Hand Delivery", vol. 180, No. 6, (2012), 3 pages.

uNu Electronics Inc. Named as CES Innovations 2013 Design and Engineering Award Honoree_www.prweb.com_releases_2013_1_prweb10300650.html_Jan. 8, 2013_2 pages.

Office Action on U.S. Appl. No. 29/419,766 dated Feb. 10, 2014.

MESSAGING DEVICE

CROSS REFERENCE TO RELATED APPLICATIONS

This application claims the benefit of priority under 35 U.S.C. §120 as a continuation of U.S. patent application Ser. No. 13/795,480, filed Mar. 12, 2013 and titled "Messaging Device", which claims the benefit of priority under 35 U.S.C. §119 of U.S. Provisional Patent Application Ser. No. 61/641,094, filed May 1, 2012 and titled "Messaging Device" each of which are incorporated herein by reference in their entirety.

BACKGROUND

Attention-getting and easily configurable signs are neither personal nor portable. For individuals in an open space, visible message expression solutions are bulky, awkward, or single use. For each personal solution today, there are shortcomings. Cardboard and preprinted banners are portable but not reconfigurable. Whiteboards and chalkboards are reconfigurable, but not very portable. Smartphones are portable and reconfigurable, but are limited by viewing angles and ambient light.

SUMMARY

At least one aspect is directed toward a hardware portable messaging device that may be referred to herein as a Flashpod. In one implementation, the portable messaging device is a self-powered, portable, hardware device. An LED array (also referred to as an LED display) on one flat side (e.g., a display panel) of the portable messaging device illuminates individual lights to display text, images, symbols, or messages output via integrated controls or a software application programming interface (API) or other protocol used as an interface for communication within or between portable messaging device components. The portable messaging device can be molded into any form factor. For example, the portable messaging device can be part of a case for a portable electronic device. The portable messaging device can incorporate a rechargeable battery, can have USB connectivity, and can have wireless communication, for example to provide or adjust a display. The portable messaging device can access or include gyroscopic and proximity sensors to determine its spatial orientation relative to other messaging devices, people, geographic coordinates, the ground, the horizon, or other electronic devices.

At least one aspect is directed to a hardware portable messaging device that allows an associated carrier to broadcast a visible message to a targeted audience in an open space. Messages and images for display by the portable messaging device can be created and stored on, for example, a paired or linked smartphone, computing or media device, tablet computer, personal digital assistant, other portable messaging device, or the portable messaging device itself. In some implementations, an application running on a connected device or a control on the Flashpod portable messaging device triggers an output on an integrated LED display of the portable messaging device to illuminate individual lights (e.g., of the LED display) in the form an image, animation, or text message.

At least one aspect is directed to a Flashpod portable messaging device enabled with wireless connectivity to communicate with nearby messaging devices. For example, wirelessly linked messaging devices can form an intranet, extranet, personal area network, local area network, or virtual private network exchanging data via WiFi or Bluetooth communication protocols. In one example, while in a linked state, and positioned side by side, messages and animations can cross from one linked portable messaging device display to another to form the perception of a single continuous display.

At least one aspect is directed to a portable messaging device. The portable messaging device can display visual messages and communicate with additional messaging devices via a local area network. The portable messaging device can include a display panel having an inner surface and an outer surface. The display panel can include an LED array. The portable messaging device can include a control unit that can communicate with the display panel, and the portable messaging device can include a first lateral side wall and a second lateral side wall. The first lateral side wall and the second lateral side wall, and the inner surface of the display panel can define at least part of a recessed opening. The portable messaging device can include a lid having a first end and a second end. The first end of the lid can pivot with respect to the first lateral side wall, and the second end of the lid can contact an edge of the second lateral side wall. The portable messaging device can include a connector disposed in an inner wall of the recess. The control unit can receive input via a user interface of the portable messaging device and, responsive to the input, provide a visual message to the LED array for display from the outer surface of the display panel.

At least one aspect is directed to a method of displaying visual messages on a portable messaging device. The portable messaging device can display the visual messages and communicate with additional messaging devices via a local area network. The portable messaging device can include a first lateral side wall and a second lateral side wall. The first lateral side wall and the second lateral side wall can define at least part of a recessed opening to house a portable electronic device. The portable messaging device can include a display panel including an LED array. An inner surface of the display panel can form a back panel that can define at least part of the recessed opening to house the portable electronic device. An outer surface of the display panel can include the LED array to display the visual messages. The portable messaging device can include a control unit that can communicate with the display panel and a data storage unit. The portable messaging device can include a user interface that can receive input and communicate with the control unit to provide a visual message to the LED array for display from the outer surface of the display panel. The method can include obtaining, by the control unit, visual message data corresponding to the visual message from one of the data storage unit of the portable messaging device and communication via the local area network with a computing device. The method can include providing at least a portion of the visual message data to the display panel to cause the LED array to display the visual message.

At least one aspect is directed to a portable messaging device configured to display visual messages and communicate with additional messaging devices via a local area network. The portable messaging device can include a display panel including an LED array, and a data storage unit that can store at least a portion of visual message data corresponding to a visual message. The portable messaging device can include a control unit that can communicate with the display panel and the data storage unit. The portable messaging device can include a power source coupled with the control unit. The power source can provide power to the control unit and the display panel. The portable messaging device can include a first lateral side wall and a second lateral side wall, and a user interface that can receive input and communicate with the control unit to provide the visual message to the LED array for display. The portable messaging device can include a communication interface that can communicate with a second portable messaging device via the local area network to provide at least a portion of the visual message to the second portable messaging device for display by the second portable messaging device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification

BRIEF DESCRIPTION OF DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for a portable messaging device configured to display visual messages alone or together with at least one other portable messaging device. The various concepts introduced above and discussed in greater detail below may be implemented in any of numerous ways, as the described concepts are not limited to any particular manner of implementation. Examples of specific implementations and applications are provided primarily for illustrative purposes. The present application is generally directed to a messaging device and systems and methods of providing a personal, portable, open-space messaging device.

Figure 1:
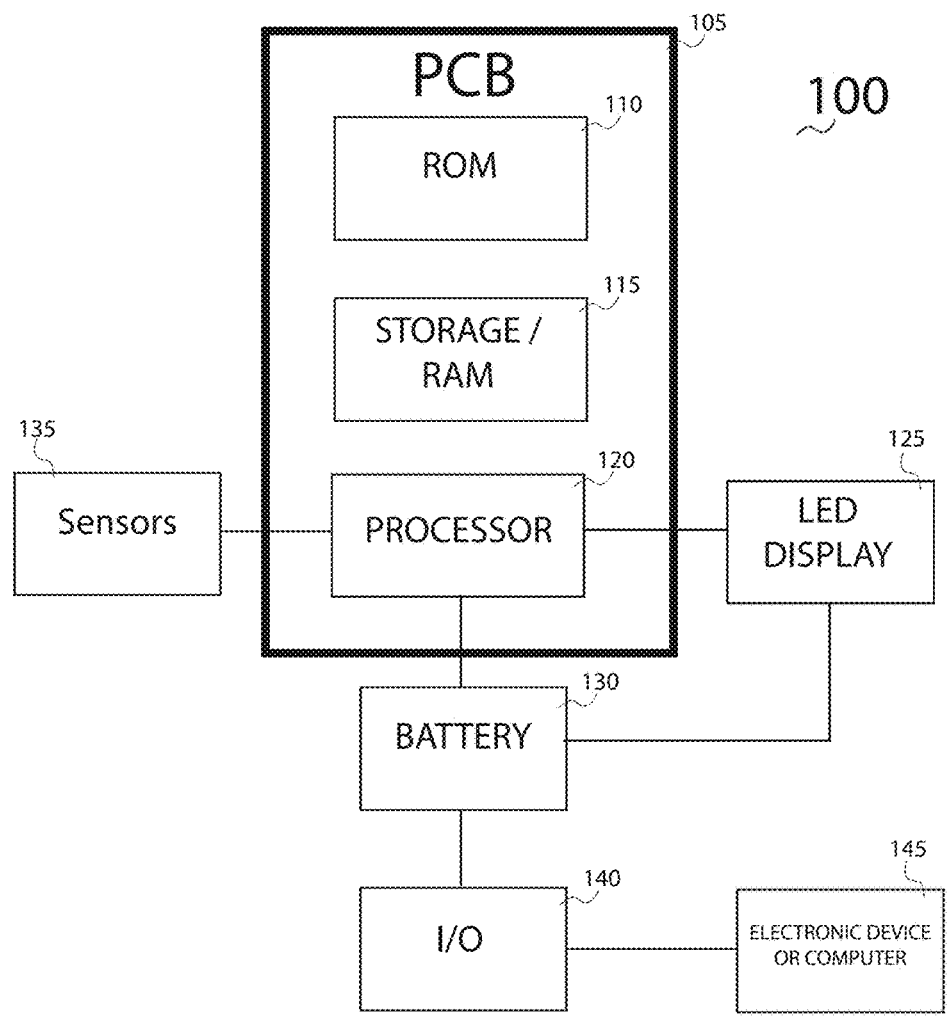
FIG. 1 is a block diagram of an implementation of a control system of a portable messaging device.
Figure 2:
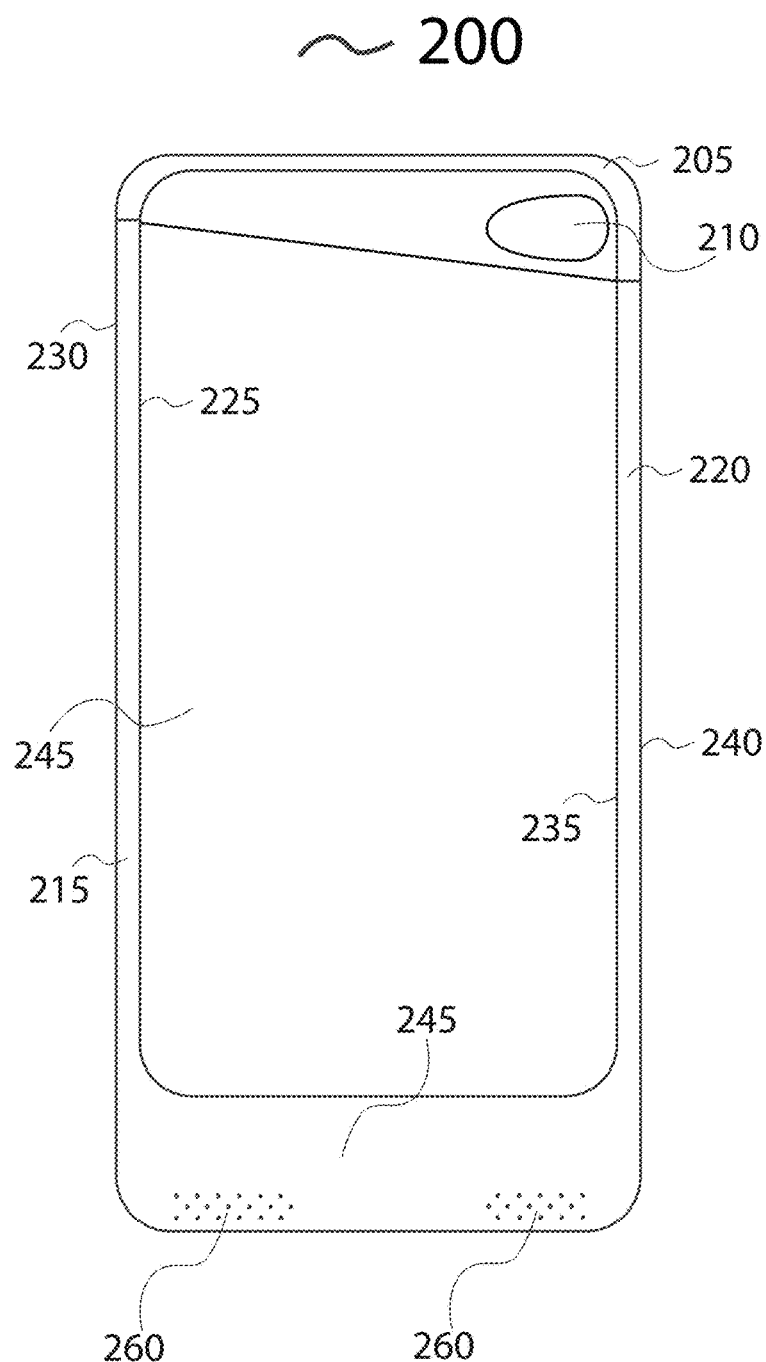
FIG. 2 is a front view of an implementation of a portable messaging device.

FIG. 1 depicts an implementation of a control system 100 of a portable messaging device such as the portable messaging device 200 (also referred to as the messaging device 200) as in FIG. 2 and other FIGS. The control system 100 can include at least one printed circuit board (PCB) or other control unit 105. The control unit 105 can include or communicate with at least one read only memory (ROM) or other memory or data storage unit 110, at least one random access memory (RAM) or other data storage unit 115, and at least one processor or other control unit (e.g., a processor, application specific integrated circuit, or programmable gate array) 120 to control the display of visual messages within one messaging device 200 or coordinated between multiple messaging devices 200.

The control system 100 can include at least one light emitting diode (LED) display 125, (also referred to herein as a LED array). The LED array 125 can include at least one LED or other illumination element that can be controlled by control unit 105 to activate and deactivate in a sequenced or patterned fashion so as to display a visual message perceptible to a viewer. The control system 100 can include at least one battery or other power source 130 to power the control system 100 and components thereof. The power source 130 can be coupled with components of the control system 100, such as the control unit 105 and the LED array 125.

The control system 100 can also include at least one sensor 135 to provide information regarding the state or orientation of the messaging device 200. For example, the sensor 135 can include at least one gyroscopic sensor. The control unit 105 can receive data as input from the gyroscopic sensor and can use this data to determine the orientation of the messaging device 200. Based on the orientation, the control unit 105 can provide visual messages for display by the LED array 125 with the proper spatial orientation, e.g., horizontal, vertical, or landscape orientations. The sensor 135 of a first messaging device 200 can also include at least one proximity sensor that can detect additional messaging devices 200 that are within a threshold distance or range (e.g., less than 50 meters) of the first messaging device 200. In one implementation, the control unit 105 communicates with the gyroscopic sensor or the proximity sensor to determine spatial orientation of messaging device 200 relative to each other, or to geographic coordinates, the ground, the horizon, or another messaging device 200. The control unit 105 can communicates this data to the other detected messaging devices 200.

The control system 100 can include at least one interface 140. The interface 140 can include an input interface or an output interface, and can be an electrical interface or mechanical interface, as well as combinations thereof. The interface 140 can communicate with at least one electronic device 145 (e.g., a smartphone) that is not the messaging device 200, for example to receive instructions regarding a display pattern of a visual image to display using LED array 125. In this example, a software application of the electronic device 145 can provide a visual message, or instructions regarding display of a visual message to the control unit 105. Responsive to receipt of these instructions, the control unit 105 can cause the LED array to display the visual message. For example, the visual message can be typed into an interface of an electronic device 145 and communicated from the electronic device 145 to the messaging device 200 for display by the messaging device 200. The interface 140 can also receive input data from a user that can be provided to the control unit 105 to identify, select, adjust, or display visual messages using the LED array 125. In some implementations, the interface 140 can transmit or receive communications to or from additional messaging devices 200.

The power supply 130 can include a rechargeable battery or disposable battery incorporated into the messaging device 200, which may form a case for an additional electronic device 145. The battery can provide power to illuminate the LED array 125 and to power the processor 120 integrated into the PCB 105 of the messaging device 200. The battery can be molded into the form specific to the messaging device housing. The battery in one example is not removable or user-serviceable. The battery can charge or recharge until fully charged when a cable is connected into the pass-through socket (e.g., an interface 140 discussed herein) and the other end of the cable is connected to a power source or USB device that provides enough power to charge the battery. In one implementation, the messaging device 200 is part of a case that can house a smartphone (or other computing device) and the power supply 130 of the messaging device 200 can provide power to operate the smartphone, for example as a backup or supplemental power supply when the power supply of the smartphone is low or discharged.

FIG. 2 is a front view of an implementation of a portable messaging device 200. The messaging device 200 can include the control system 100 of FIG. 1. The messaging device 200 can be a portable device having dimensions roughly or slightly larger than a smartphone. For example, the messaging device 200 can be substantially rectangular in shape, for example with rounded corners. The messaging device 200 can have other shapes, e.g., square, triangle, other polygonal shape, ellipse, oval, or circular. The dimensions of the messaging device 200 can vary. In one implementation, the messaging device 200 has a length of approximately 4.69 inches, a width of approximately 2.50 inches, and a depth of approximately 0.69 inches. In one implementation, the messaging device 200 has a length of approximately 5.00 inches, a width of approximately 2.50 inches, and a depth of approximately 0.69 inches. These approximate measures are accurate within +/−15%. In one implementation, the messaging device 200 is configured to house a tablet computer and has dimensions substantially larger than the above two examples.

The messaging device 200 can include at least one lid 205, and at least one cutout 210. For example, the messaging device 200 can be formed as a case for a smartphone or other electronic device 145. The electronic device 145 is not illustrated in the example of FIG. 2. The messaging device 200 can include a first lateral side wall 215 and a second lateral side wall 220. For example, lateral side walls 215, 220 of a generally rectangular messaging device 200 can form at least part of the longitudinal edges of the messaging device 200. The first lateral side wall 215 can include an inner surface 225 and an outer surface 230. The second side wall 220 can include an inner surface 235 and an outer surface 240. In one implementation, the inner surface 225 of the first lateral side wall 215 and the inner surface 235 of the second lateral side wall 220 can form at least part of a recessed opening 245. The recessed opening 245, (which can be the same opening as the recessed opening 705 discussed herein) can form a slot or area for the disposal of the electronic device 145. In this example the messaging device 200 forms a case for the electronic device 145. In some implementations the lid 205, illustrated in a closed position on the example of FIG. 2, and the base panel 250 form part (e.g., a top part) of the recessed opening 245. In one implementation the recessed opening 245 is constructed and arranged to house the electronic device 145. The messaging device 200 can also include at least one display panel (discussed further herein, as in FIG. 7, for example) that can include the LED array 125 and define at least part of the recessed opening 245. In one implementation, the first lateral side wall 215 and the second lateral side wall 220 are sides of the messaging device and do not form part of any recessed opening 245, for example when the messaging device 200 is not configured as a case for an additional electronic device 145.

The messaging device 200 can be made of a plastic, rubber, or composite device, and can be formed from a single mold, into which components such as the control system 100 are assembled, or from separate components. For example, the lateral side walls 215, 220 can be an integral part of (e.g., extensions) adjacent components such as the base panel 250 or the display panel, or separate elements that are fixed together. The messaging device components such as the lid 205 and the lateral side walls 215, 220 can be rigid or flexible. For example, the messaging device 200 can be made in part of rubber with some flexibility to accommodate the insertion and removal of the electronic device 145.

The cutout 210 can include an aperture or opening in the messaging device 200 for power or data inputs, to access messaging device controls, or for a lens of a digital camera. The cutout 210 can be disposed in the lid 205 in a front facing manner, as in FIG. 2 or on other surfaces of the messaging device 210. For example, the cutout 210 can include openings defined by the lid 215, lateral side surfaces 215, 220, base panel 250, or the display panel discussed herein. The cutout 210 can provide visual, manual, or audio access to components of an electronic device 145 disposed at least in part in the recessed area, as discussed herein for example with reference to FIG. 7. In one implementation, the opening 210 is aligned with an audio, visual, or physical interface of the electronic device 145 to allow access to the electronic device interfaces.

In some implementations, the messaging device 200 includes at least one speaker or microphone 260. The speakers 260 or the microphones 260 can be disposed in the base panel 250 to provide audio input or output to or from an electronic device 145 disposed in and operably connected with the messaging device 200. The speakers or microphones 260 can be coupled to the control system 100 to operate.

Figure 3:
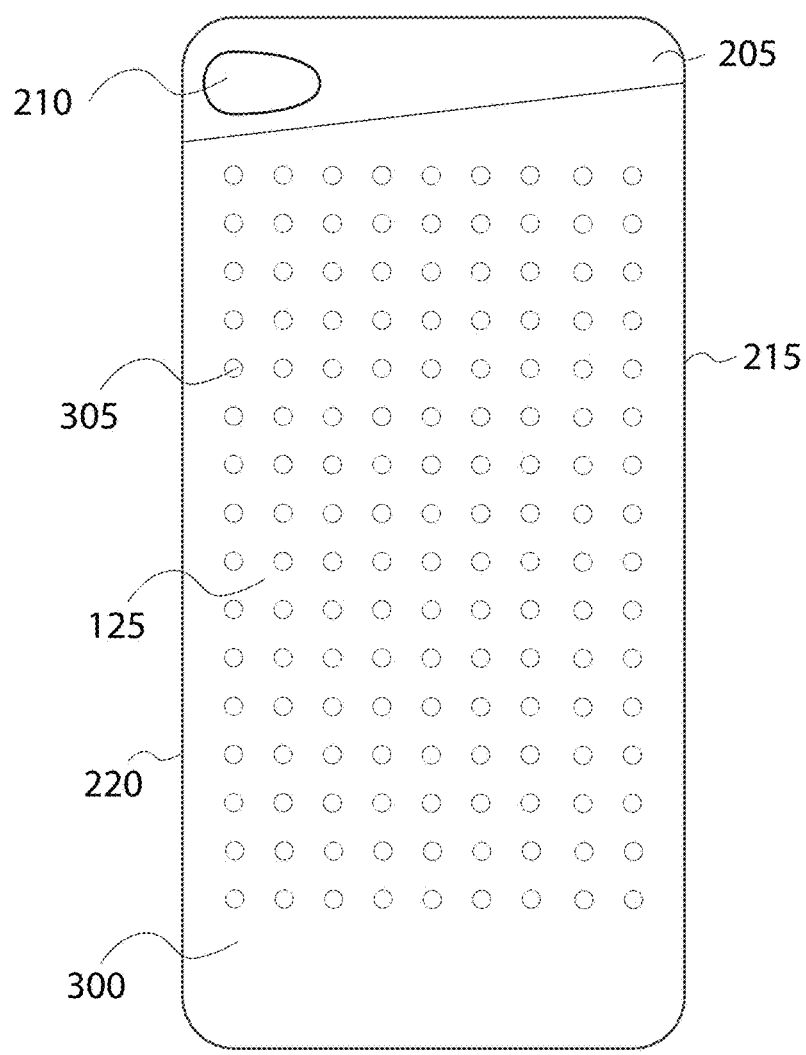
FIG. 3 is a back view of an implementation of a portable messaging device.

FIG. 3 is a back view of an implementation of the portable messaging device 200. The display panel 300 can include the LED array 125. For example, the LED array 125 can be embedded in the display panel 300 with individual LEDs 305 visible facing outward from the back side of the messaging device (e.g., facing the viewer as in FIG. 3). Responsive to directions from the control system 100, (directly or via an electronic device 145 disposed in the recessed area, the LED array 125 can illuminate in a controlled, patterned, or sequenced fashion to display at least part of a visual message.

Figure 4:
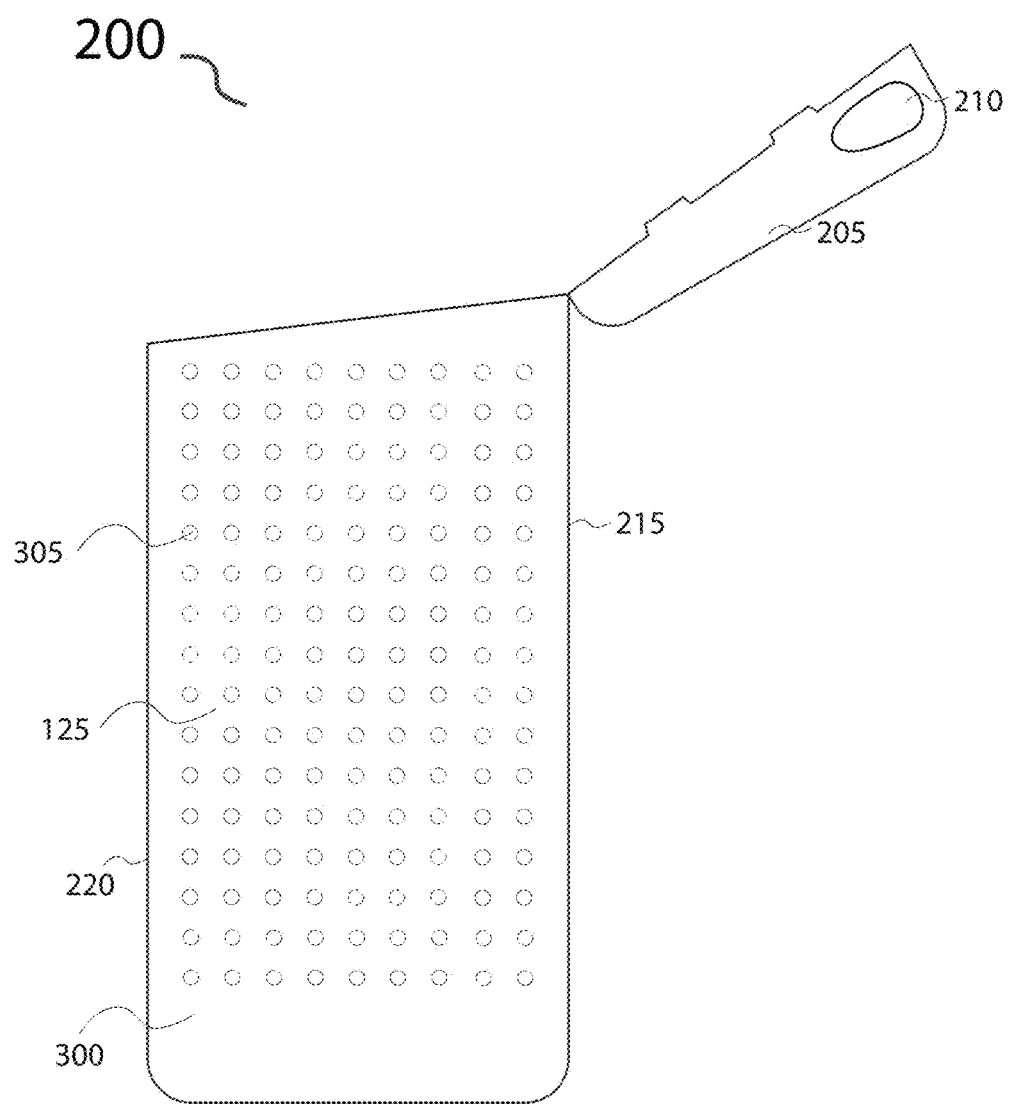
FIG. 4 is a back view of an implementation of a portable messaging device with a lid in an open position.

FIG. 3 depicts an example of the messaging device 200 with the lid 205 in a closed position. For example, with an electronic device 145 connected to the messaging device 200 and generally disposed in the recessed opening 245, the lid 205 can be configured in a closed position to house the electronic device 145 within the recessed area. FIG. 4 is a back view of an implementation of the portable messaging device 200 with the lid 205 in an open position. For example, the lid 205 can pivot or rotate to open and close to facilitate the insertion or removal of a smartphone, personal digital assistant, mobile telephone, computer, or other electronic device 145 in the recessed area. In this example, the messaging device 200 is constructed as a case for an electronic device 145.

In one implementation, the messaging device 200 includes at least one LED array 125. For example, as a self-contained messaging device, the messaging device 200 can be configured to display messages using an integrated LED array 125. In one implementation, each LED 305 in the array can be individually controlled and regulated by integrated circuits on a Printed Circuit Board (or PCB) control unit 105 of the messaging device 200. The LEDs 305 can be controlled to illuminate, dim, or darken with the color and luminous intensity called by the program that sends data to the messaging device 200. The program can be executed by a processor or other logic device of the messaging device, (e.g., the control unit 105) or by a supplemental computing device such as a smartphone that transmits instructions to the messaging device 200 via a wireless connection, (e.g., an electronic device 145 communicatively linked to the messaging device 200.

The LEDs 305 can be illuminated (e.g., continuously or intermittently), to create or form an image or text, such as a letter, number, word, pattern, or symbol. The LEDs 305 can be controlled by logic of the messaging device (the control system 100) or of the supplemental electronic computing device (e.g., smartphone) to illuminate or darken in a sequence that forms the perception of a moving image or scrolling text. These visual messages (e.g., images or text messages) can be perceivable or readable by a viewer at a distance several meters to several dozen meters away from the carrier of the messaging device 200, for example.

Individual LEDs 305 in the LED array 125 emit light of either a distinct color, a set of colors, or range of colors generated by a multi-colored (such as a Red/Green/Blue) LED. In one implementation, due to the luminous intensity of each diode the diodes are spaced apart by approximately (e.g., +/−10%) 6 mm from diode center to diode center, or approximately 3.75 mm from diode edge to diode edge. The LED array 125 of the messaging device 200 can be arranged as a rectangular grid, or as a square, triangle, other polygonal shape, ellipse, oval, or circle. In one implementation, the LED array 125 has a diode resolution of 9×16 positioned in a vertical orientation. However, the LED array 125 can be arranged to accommodate the space available to it, and any number of diodes arranged across or down in a grid of the LED array 125. The LEDs 305 that form the array can be powered by the internal battery of the messaging device (e.g., the power source 130), or a by a power source connected to a USB port or other interface of the messaging device 200.

In some implementations, at least one LED 305 of the LED array 125 of the messaging device 200 can illuminate in a flash sequence. For example, data output to, generated at, or received by the messaging device 200 can instruct LEDs 305 of the LED array 125 to illuminate. The instructions can be for an individual LED array 125, patterns of LEDs 305 of the LED array 125, or all LEDs 305 of the array 125. The LEDs 305 (or other lighting elements) in the LED array 125 can illuminate, dim, brighten, or darken individually according to a requested light pattern. Patterns displayed on the LED array 125 can create an image, letter, or symbol. Consecutive patterns of LED array illumination can create an animation or flash sequence.

Figure 5:
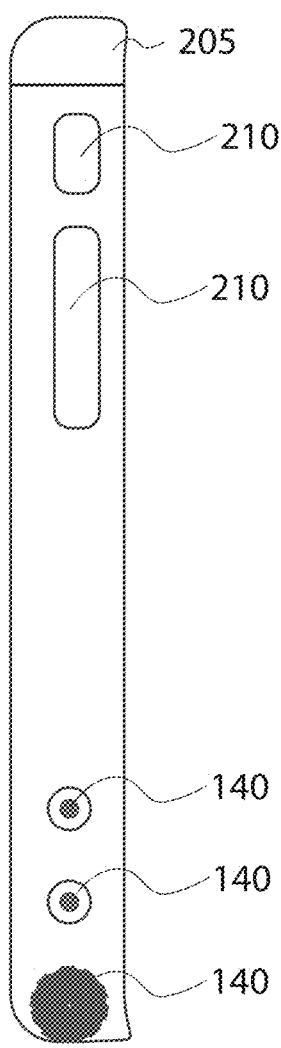
FIG. 5 is a side view of an implementation of a portable messaging device.
Figure 5A:
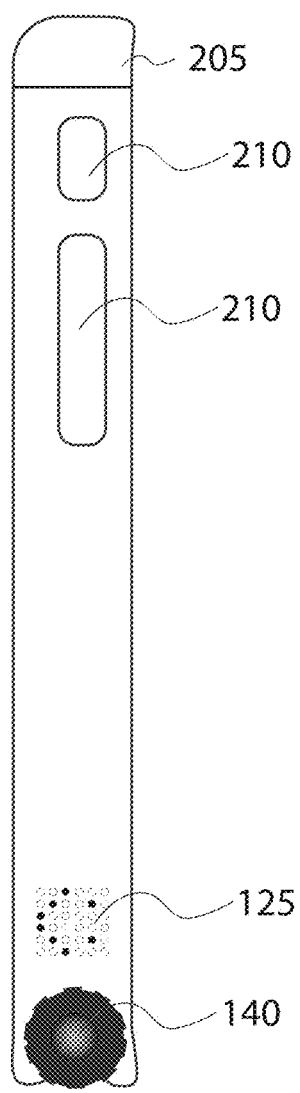
FIG. 5A is a side view of an implementation of a portable messaging device.
Figure 6:
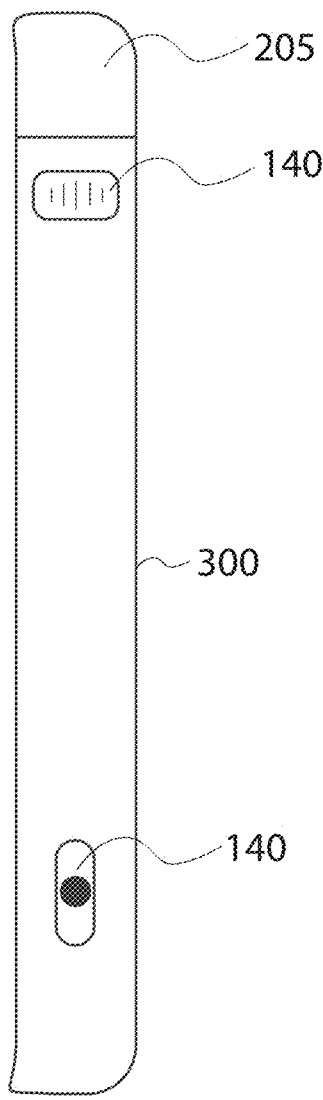
FIG. 6 is a side view of an implementation of a portable messaging device.

FIG. 5, FIG. 5A, and FIG. 6 are side view implementations of the portable messaging device 200. The messaging device 200 can include at least one interface 140 configured to communicate with additional messaging devices or other devices. The interface 140 of the messaging device 200 can include a user interface. A user via the user interface can communicate with a messaging device controller (e.g., processor 120) of the control system 100 to rotate between flash sequences or sets of flash sequences of the visual message by the LED array 125.

In some implementations, an application on a computer (e.g., a smartphone) that exchanges data with the messaging device 200 via either a wired or wireless connection can download and store an image or flash sequence to data storage units 110 or 115 for later recall by the messaging device 200. For example, an image of a butterfly can be downloaded to the messaging device 200 and stored in a memory unit 110 or 115 of the messaging device 200. A flash sequence representing the butterfly flying can also be downloaded and stored in memory 110 or 115 on the messaging device 200. The interface 140 can be a mechanical interface (e.g., a button or series of buttons) that can communicate with the control system 100 to output the butterfly image or flash sequence to the LED array 125. In one implementation, the interface 140 includes a mechanical interface coupled to the outer surface 230 of the first lateral side wall, or to the outer surface 240 of the second lateral side wall. Mechanical, electrical, or electro-mechanical interfaces 140 can be disposed at other surfaces of the messaging device 200, such as on the display panel 300 or the base panel 250, for example. In one implementation, actuation of the mechanical (or other) interface 140 causes the control unit 105 to provide at least part of a visual message to the LED array 125 for display.

The interface 140 (e.g., a selector dial, activation button, or status indicator) can allow a user to select a mode of operation of the messaging device 200, such as a particular visual message or flash sequence. For example pressing or holding a button, or multi-clicking a button, can cause the control system 100 to perform additional functions such as configuring display settings of the messaging device 200 or setting user-configurable actions. In one implementation, a digital status indicator (e.g., part of the LED array 125 or a separate interface 140) can inform a user or other view of a state of the messaging device 200. For example, the status indicator can display both images and animations. In one implementation, a second LED array 125 (as in FIG. 5A for example) is the status indicator.

In some implementations, the flash sequences or images are created with a software application that can be downloaded or streamed to the messaging device 200 as data. Where the messaging device 200 is molded into or otherwise configured as a case for an electronic device 145 such as a smartphone, tablet computer, or any device that runs an application, a messaging device API or Application Programming Interface runs on the device, communicates with the application, and sends the data required to output the image or sequence to the LED array 125 of the messaging device 200.

The API of the messaging device 200 can include an application running on a connected device (e.g., a smartphone or other device) that can communicate with the messaging device 200 via the interface 140 so that the messaging device 200 receives an image (e.g., a visual message) to form display from the LED array 125 or receives instructions to initiate a flash sequence from the connected device. The messaging device API can also allow a connected device to repurpose a default function of the messaging device 200. For example, the API executing on the control system 100 can receive instructions to execute a custom function such as initiate a new flash sequence or take a picture with a connected device's built-in camera. In, for example, an armband implementation discussed herein, the interface 140 could include a mechanical button or disk to allow control of a connected music device responsive to user input. In this example, the user interfaces with the messaging device 200 to control a different electronic device 145 (e.g., smartphone) that communicates with the messaging device 200 via the interface 140 or other connector.

The instructions can originate from the processor 120 or control unit 105 of the messaging device 200 or from a supplemental electronic device 145 that communicates with the messaging device 200. In one implementation, the messaging device API is written for the connected device's (e.g., smartphone's) operating system and can be integrated into the application that outputs instructions to the messaging device 200 to display images using the LED array 125.

Flash sequences and images can also be initiated in response to sensor-driven actions. For example, shaking the messaging device 200 in quick side-to-side (or other) motions could initiate the messaging device 200 to generate an emergency or distress flash sequence, change the LED output color, or initiate a flash sequence. For example, the sensor 135 could include a position, motion, accelerometer, or force sensor that can detect motion or changes in motion and provide input to the control system 100 to cause the control unit 105 to select a visual message for display by the LED array 125 from the display panel 300. Images or text displayed on the messaging device 200 can communicate messages to targeted or general audiences using a standard or default color, such as red or another primary color. In one example, for purposes of emergency or distress messaging, the interface 140 (e.g., a button), application, or messaging device movement can trigger the control system 100 of the messaging device 200 to execute a flash sequence in a color different from the default color for display by the LED array 125.

The side panel of the messaging device (e.g., an outer surface of the first lateral side wall 215 or the second lateral side wall 220) can include at least one LED array 125, as in the example of FIG. 5A. The messaging device 200 can include more than one LED array 125, such as a first LED array on the outer surface of the display panel 300, and a second LED array 125 on an outer surface of the first or second lateral side walls 215, 220. The control system 100, directly or responsive to external instructions received from a control system of a different electronic device 145, can provide (e.g., from data storage units 110 or 115) visual messages to multiple LED arrays 125 on one messaging device 200. The control system 100 can provide the same visual message for simultaneous, alternating, or sequential display on multiple LED arrays of one messaging device 200. In some implementations, the control system 110 provides a visual message for display on one LED array 125 (e.g., from the back or outer surface of the display panel) and a derivative of the same visual message for display on another LED array 125 of the same messaging device (e.g., from the outer surface of one or both of the lateral side walls 215, 220). For example, the derivative visual message can be a smaller version, less accurate version, or partial version of the primary visual message. In some implementations, the control unit 105 generates the derivative visual image.

The LED arrays 125 can be disposed on the display panel 300, first or second lateral side walls 215, 220, other lateral side walls (e.g., top of the lid 205 or bottom of the base panel 250, or the front, back, or side surfaces of the base panel 250). In one implementation, one LED array 125 is disposed on multiple messaging device 200 components, such as a single LED array 125 on both the display panel 300 and one or more of the first and second lateral side walls 215, 220.

FIG. 6 is a side view of an implementation of the portable messaging device 200 having at least one interface 140 configured to communicate with additional messaging devices or other devices. The interface 140 can receive user input or can be used to communicate with additional messaging devices 200 or other electronic devices 145. The interface 140 can be electrical, mechanical or electro-mechanical. The interface 140 of the messaging device can incorporate buttons, switches, or dials to control messaging device-specific functions. For example, rotating a dial on the messaging device can cycle though preloaded flash sequences or images to be recalled. The dial can also control the speed of the flash sequence. The dial can also cycle though user preferences. In some implementations, pressing the interface 140 that includes one of a set of buttons initiates a pre-loaded flash sequence or image to be displayed. For example, if the user tends to use his or her device for taking pictures, the sequence selected flashes a countdown animation or a scrolling message reading "SMILE!". In this example the visual message includes the word "SMILE" and can be displayed by the LED array 125 on, for example, the outer surface of the display panel 300. In this example, the complete visual message can be sequentially provided to multiple messaging devices 200. Different portions of the visual message can be simultaneously displayed across different messaging devices 200. In one implementation, the same portion of a visual message can be simultaneously displayed by two different messaging devices 200. The messaging device buttons can also function as selection tools when navigating objects and images in the LED array 125.

In one implementation, when the messaging device 200 is not connected to another computer or electronic device 145, manipulating specific messaging device controls (e.g., the interface 140) allows the user to read messaging device-specific information such as battery level, brightness, message scroll speed, default LED color, communication status, and flash sequence sets. Pressing a specific button or sequence either on the messaging device 200 or a connected electronic device 145 can initiate a preselected distress flash sequence. The flash sequence is designed to display a visual message anyone within visual range that the carrier needs immediate assistance. The flash sequence, for example, could illuminate: "HELP" or "SOS".

Figure 7:
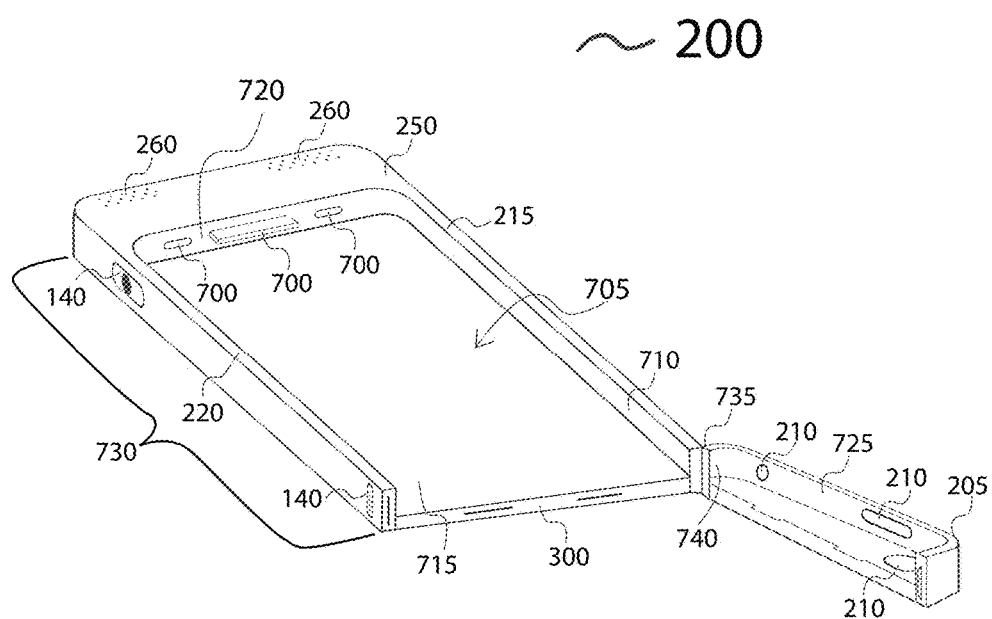
FIG. 7 is a top perspective view of an implementation of a portable messaging device with a lid in an open position.
Figure 8:
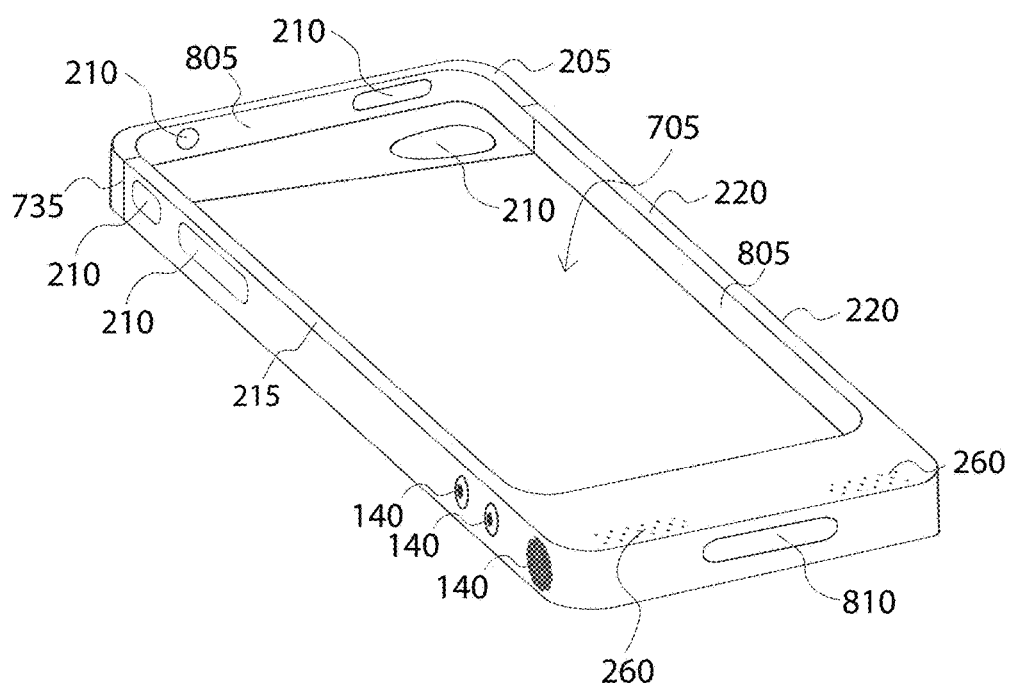
FIG. 8 is a top perspective view of an implementation of a portable messaging device with a lid in a closed position.
Figure 8A:
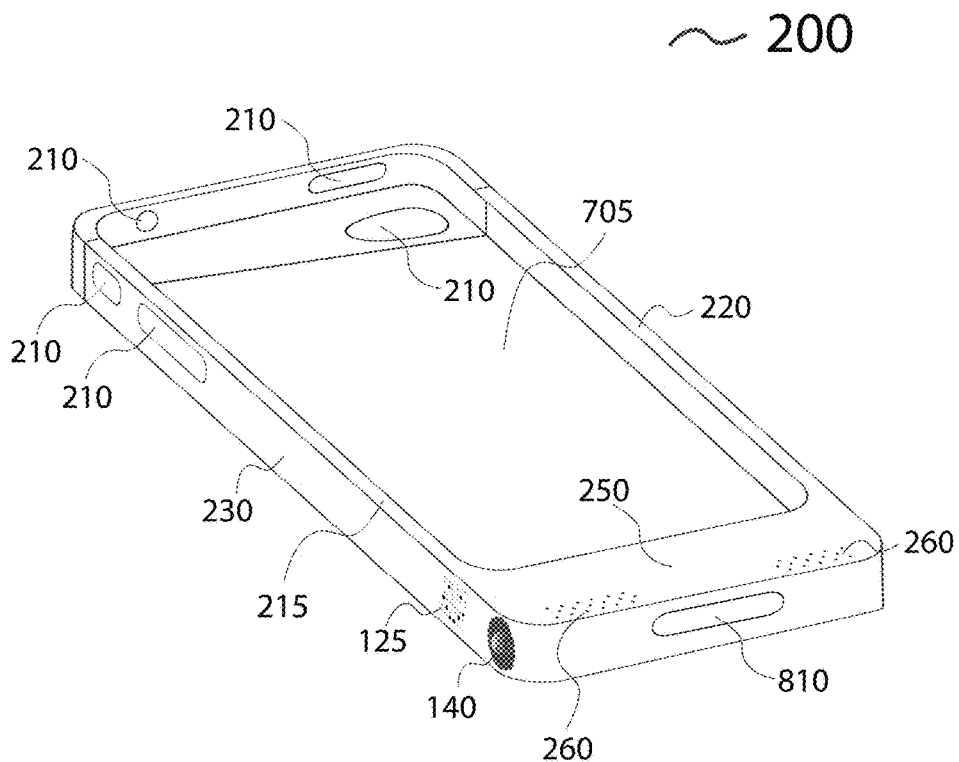
FIG. 8A is a top perspective view with lid closed of a portable messaging device.
Figure 9:
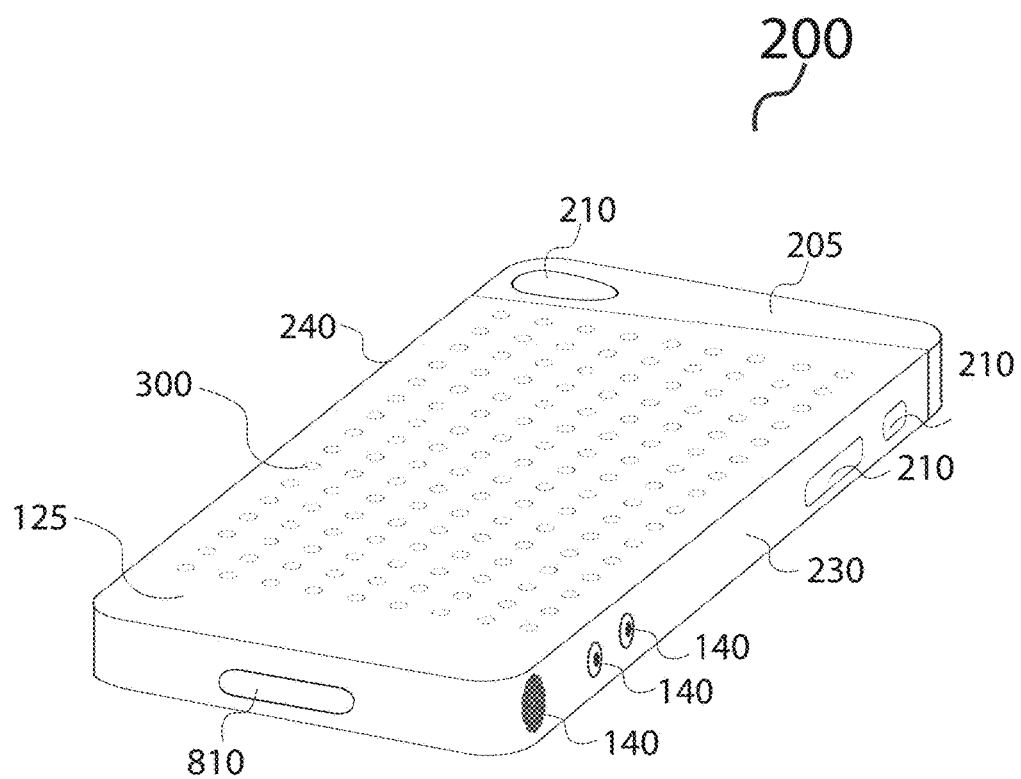
FIG. 9 is a bottom/back perspective view of an implementation of a portable messaging device with a lid in a closed position.
Figure 9A:
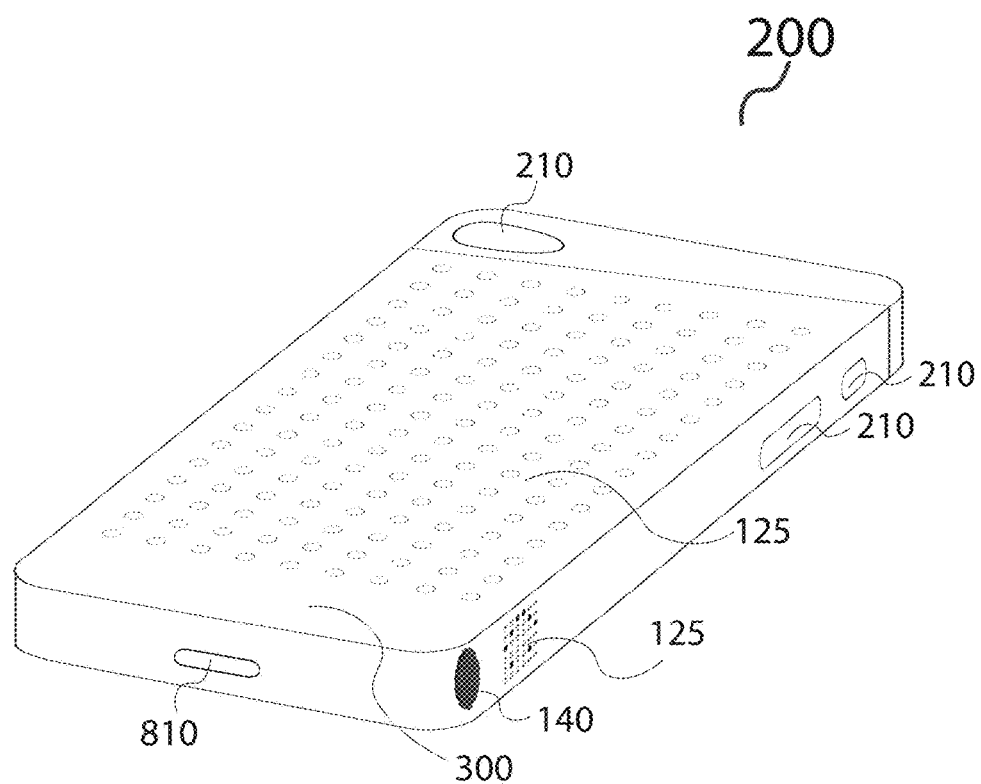
FIG. 9A is a bottom/side perspective view of an implementation of a portable messaging device with a lid in a closed position.

FIG. 7 is a top perspective view of an implementation of the portable messaging device 200 with the lid 205 in an open position, for example to receive or remove a smartphone or other electronic device 145. FIG. 8 is a top perspective view of an implementation of the portable messaging device 200 with the lid in a closed position, for example to secure a smartphone or other electronic device 145. FIG. 8A is a top perspective view of the portable messaging device 200 with the lid 205 closed, for example to secure the messaging device, and with the LED array 125 on the outer surface 230 of the first lateral side panel 215. FIG. 9 illustrates a bottom perspective view example of the case 200 with the lid 205 closed, for example to secure the messaging device, where the messaging device LED array 125 displays from the back of the messaging device 200. FIG. 9A is a bottom/side perspective view of an implementation of the portable messaging device 200 with the lid 205 in a closed position, and with a first LED array 125 on the display panel 300 and with a second LED array 125 on the outer surface 230 of the first lateral side panel 215.

Referring to FIGS. 7-9A among others, the messaging device 200 can include connectors 700 and speakers or microphones 260 to communicate with the messaging device or supplemental devices. The connectors 700 can include USB or proprietary connectors to mate the messaging device 200 with an additional electronic devices 145 so the control system 100 and a control system of the electronic device 145 can communicate. In one implementation, the power source 130 can provide power to the additional electronic device 145, for example when a power supply of the additional electronic device 145 is unavailable or exhausted.

Responsive to manual force, the lid 205 can flip open and closed to facilitate insertion and removal of an electronic device 145 from the recessed area 705. With reference to FIG. 2, FIG. 7 and FIG. 8, among others, the recessed area 705 can include a general opening or volume to accommodate an electronic device 145. In some implementations, the recessed area 705 can be defined at least in part by an inner surface 710 of the first lateral side wall 215, an inner surface 805 of the second lateral side wall 220, and an inner surface 715 of the display panel 300. The recessed area can also be defined at least in part by an inner wall 720 of the base panel 250, and an inner surface 725 of the lid 205.

In one implementation, with the lid 205 in the open position, the electronic device 145 can be disposed in the recessed area 705. Once disposed, a user can close the lid 205 to secure the electronic device 145 within the recessed area 705. In some implementations, a connector at the base of the electronic device 145 can connect with at least one connector 700 to provide for electrical communication between the messaging device 200 and the electronic device 145 disposed in the recessed area 705.

In some implementations, the messaging device 200 is, is incorporated into, or includes a case or housing for an electronic device 145. For example the messaging device 200 can include a smartphone case that can house a smartphone. The case can offer some degree of protection to the electronic device 145 from nominal impact should it be struck or dropped. In one example, for a smartphone or other device that incorporates a front-facing screen, the messaging device 200 does not hinder full use of the screen when the electronic device 145 is disposed in the recessed area 705. If the electronic device 145 incorporates a front-facing camera, the messaging device 200 does not cover the opening for the camera in one example. In some implementations, the messaging device 200 that also forms a protective case for an electronic device 145 can include two interlocking sections, e.g., the lid 205 and the main body 730 that encase the electronic device 145 leaving the electronic device's main display exposed and accessible, e.g., facing outwardly from the recessed area 705 where it is visible to a user. The messaging device 200 case enclosure can be formed of impact absorbing material, which can provide a degree of protection to the electronic device 145 as well as the electronic components of the Flashpod messaging device 200.

In one implementation, the messaging device 200 provides openings 210 to allow access to the electronic device's most often used buttons such as power, volume, mute, or silent. In some implementations, the case is an integral part of the messaging device 200, and the supplemental electronic device 145 (e.g., smartphone) can be disposed within the case. In one example, the messaging device 200 does not cover the electronic device's keyboard whether comprised of physical keys or keys virtually generated on the device's display screen, and the messaging device 200 neither interferes with nor enhances light sensors, motion sensors, or gyroscopic sensors of the encased electronic device 145 in various implementations. The messaging device 200 can allow the electronic device 145 to be easily inserted and removed from an internal dock connector 700 of the messaging device. In some implementations, the interfaces 140 and openings 210 are positioned on the messaging device 200 so as not to interfere with audio inputs or outputs, docking ports, connection ports, SIM cards or other components of the electronic device 145.

The lid 205 or upper section of the messaging device 200 can be hinged to the main body 730 or lower section across the width of one of the lateral side walls 215, 220. With reference to FIG. 7, at least one hinge 735 can couple the lid 205 with the first lateral side wall 215. In some implementations, the hinge 735 can couple the lid 205 with the second lateral side wall 220. Connecting means other than the hinge 735 can be used. For example snaps, flexible material, sliding connections, or press fittings can couple the lid 205 with the main body 730. In one implementation, rather than the hinge 735, the lid 205 is completely removable from the main body 730, and can be coupled to the main body 730 by, for example a snap fitting or hook and loop interlocking mechanism. In one implementation a first end 740 of the lid contacts, or can pivot with respect to, an edge of the first lateral side wall 215. A second end 745 of the lid can contact an edge of the second lateral side wall 220.

The lid 205 or upper section can be locked in place via a latching mechanism on the opposite sidewall forming a secure enclosure. The top section of the case (e.g., the lid 205) can incorporate a hook for the latch to catch into a hole in the lower section. Sliding a lever on the latched sidewall can release the hook and allow the upper section (e.g., lid 205) to flip open. Tabs incorporated into the back wall of the top section (e.g., lid 205) guide and further secure it into the lower section (e.g., main body 730). The upper section (e.g., lid 205) of the messaging device 200 can completely cover the top wall, partial upper sidewalls and a partial upper back wall of the encased electronic device 145. Openings 210 in the top section (e.g., lid 205) can accommodate access to essential functions and features like the power button, an audio jack, antenna, or other often-used switches or buttons, as well as a built-in camera and flash.

In one implementation, the lower section e.g., the base panel 250 or the main body 730 of a messaging device case can include any of a power input receptacle (e.g., to receive a battery 130), a PCB (Printed Circuit Board) 105, the LED array 125, sensors 135, and other interfaces 140 such as internal dock connector, pass-through socket 810, controls, and speaker and microphone ports 260. In one implementation where the messaging device 200 includes the recessed area 705 to function as a case, the messaging device 200 can include an internal dock connector 700 that provides a physical connection between an electronic device 145 and the messaging device 200 incorporated into the case design. The case can provide a degree of protection to an electronic device 145 it docks into the proprietary or mini USB port 700 of the messaging device 200. This can establish a link that allows an application running on the electronic device 145 (e.g., smartphone) to use the messaging device LED display output 125 via the messaging device API (the control system 100). In the case implementation of the messaging device 200, the dock connector 700 can be positioned such that an electronic device 145 can be inserted into and removed from the case with ease. Access to the internal connection 700 can be maintained via a pass-through socket 810 at the bottom of the case, as in FIGS. 8, 8A, 9, and 9A for example. (The pass-through socket 810 may be also referred to as an interface or as an opening.) The pass-through socket 810 can allow a USB or proprietary cable to connect to the supplemental electronic device 145 while the electronic device 145 is disposed in the recessed area 705 of the messaging device 200. An opening 210 cut in the side or bottom wall of the case can create the pass-through socket 810. In one implementation, fashioned into the opening 210 is a pin-compatible jack that directly connects to the jack into which the encased electronic device 145 is inserted.

When a USB or proprietary cable is connected to the pass-through socket 810 while the electronic device 145 is in the recessed area 705 of the messaging device 200, data can be transferred between the electronic device 145 and a computer to which the other end of the cable is connected. When a USB or proprietary cable is connected to the pass-through socket 810 to a power source, the messaging device's power supply 130 can charge. Power may be supplied via a power adapter in a car or wall outlet, a USB outlet on a USB hub or a USB outlet on a computing device. When a cable is directly connected to the pass-through socket 810 on one and a power source on the other end, the Flashpod messaging device 200 and the supplemental electronic device 145 can charge simultaneously or sequentially if one or the other is not fully charged.

In one implementation, when a portion of the messaging device (e.g., the base panel 250 or the main body 730) the speaker or microphone 260 of the electronic device 145 disposed in the recessed area 705, the messaging device 200 includes a shaft or waveguide that covers the circumference of the speaker grill and redirects to a grill on the front of the messaging device 200. The messaging device 200 can also incorporate an amplification system that relays sound from the supplemental electronic device's internal speaker through a speaker embedded behind the grill at the lower front wall (e.g., the base panel 250) of the messaging device 200. In some implementations, in a fashion similar to the speaker redirect structure, an internal shaft or waveguide of the messaging device 200 can redirect any microphone that the case covers toward a grill at the lower front wall (e.g., the portion of the base panel 250 including the speakers 260 or the microphones 260, as in FIG. 7, among others. In the event that the microphone shaft causes sound input distortion, a microphone can be incorporated into the front of the messaging device 200 (e.g., in the base panel 250) and can output to a speaker 260 in front of the internal microphone on the smartphone or other device disposed in the recessed area.

Figure 10:
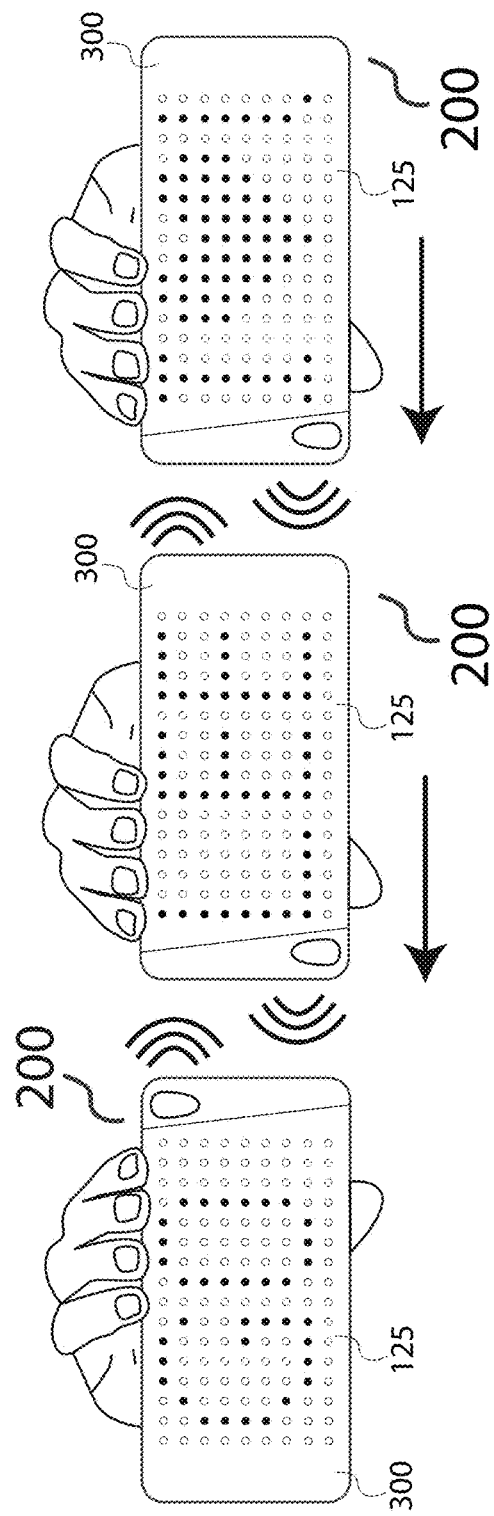
FIG. 10 is a diagram depicting an implementation of multiple device communication of a plurality of portable messaging devices to display a visual message.
Figure 11:
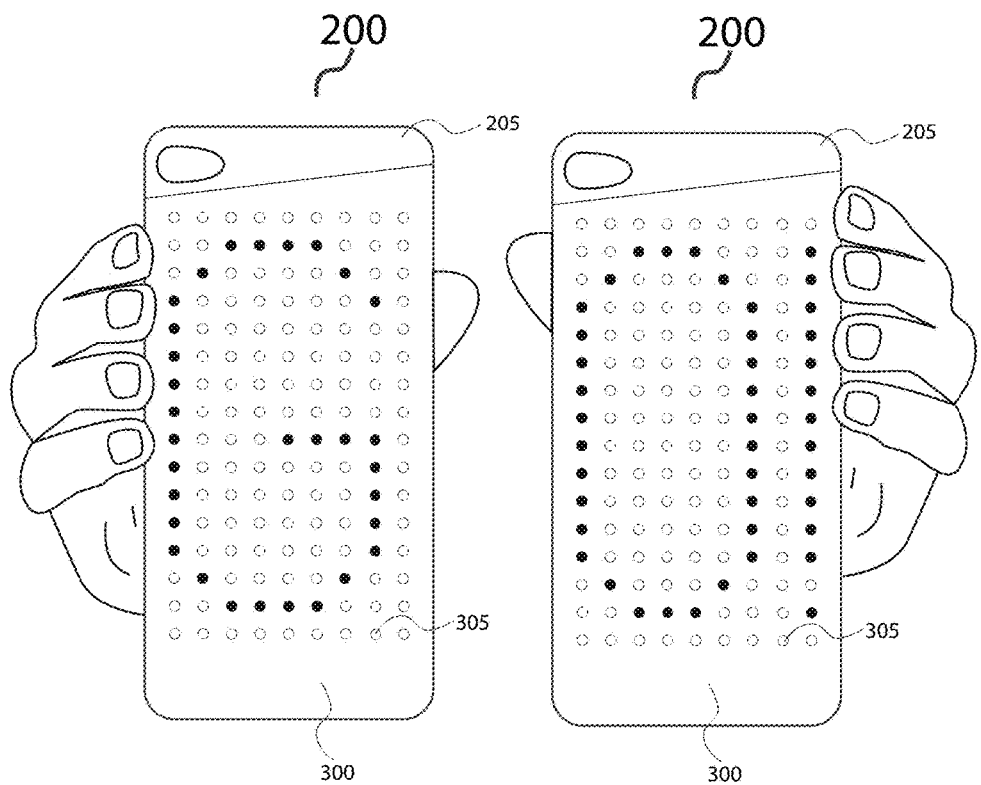
FIG. 11 is a diagram depicting an implementation of multiple device communication of a plurality of portable messaging devices to display a visual message.

FIG. 10 is a diagram depicting an implementation of multiple messaging device communication of a plurality of portable messaging devices 200 to display a visual message, where each of the multiple messaging devices 200 displays a portion of the visual message. FIG. 11 is a diagram depicting an implementation of multiple messaging device communication of a plurality of portable messaging devices 200 to display a visual message, where each of the multiple messaging devices 200 displays a portion of the visual message. In the example of FIG. 10, three messaging devices 200 are in wireless communication with each other (e.g., via interfaces 140) to coordinate a moving message from right to left across the three messaging devices 1000 that begins with LEDs illuminated to convey the message "GO LEE I [heart symbol] U . . . " This is an example, and other messages can be displayed. FIG. 11 illustrates another example of multiple device communication between a plurality of messaging devices 1000, coordinating a message beginning with the characters "GO . . . ".

The messaging device 200 can include a power switch (an interface 140) that can have three positions, e.g.: "OFF", "ON", and "LINKED". In the OFF position, the messaging device 200 can be shut down or can initiate a power down sequence. In one implementation, in the OFF position an application cannot use the LED array 125 as a display output. In the ON state, for example, the messaging device 200 can power up and be configured to receive instructions from the messaging device control unit (e.g., processor) 105 or from another electronic device 145 either via a wired or wireless connection. In this state an application from the control system 100 or from an external source can use the LED array 125 as a display output to display a visual message.

In some implementations, two or more messaging devices 200 can be paired (e.g., in communication with each other) in a LINK state. For example, an interface 140 such as the power switch (or other actuator) can be manipulated into LINK position. Moving the messaging device's power switch to the LINK position can enable the "LINK" mode. When enabled, the messaging device 200 can wirelessly pair itself with one or more nearby messaging devices that have also been switched by their carriers to LINK mode, for example, via a Bluetooth, WiFi, or other locate area network or personal area network communication protocol. In one implementation the network communication between messaging devices includes local or personal area network connections that do not require Internet or mobile phone voice or data communication network connections. These communications between messaging devices 200 or between messaging devices 200 and electronic devices 145 can be encrypted data communications, for example utilizing AES-128 bit (or other) encryption protocols. The visual messages can be displayed and transmitted between messaging devices 200 without obtaining or transmitting unauthorized personal identifying data regarding end users associated with the messaging devices 200. In one embodiment, the control system 100 of at least one messaging device 200 is a smart-ready hub that allows pairing of that messaging device with other messaging devices 200 via a Bluetooth protocol.

In some implementations, the messaging device 200 in the LINK mode activates internal wireless communication protocols to pair (e.g., couple, or electronically communicate) with nearby messaging devices 200. Paired messaging devices 200 can exchange data (e.g., between respective control systems 105 or between respective electronic devices connected to the messaging devices 200) necessary to display messages or flash sequences on their respective LED arrays 125, for example. Data exchange between the messaging devices 200 can allow paired messaging devices 200 to create the perception of a singular display from their contiguous placement. The greater the number of contiguous messaging devices 200 there are in the intranet or other local area network or computer network that interconnects messaging devices, (e.g., the greater number of linked messaging devices 200) the greater the collective display and message impact of all or part of at least one visual message to the targeted viewers. In the linked state, the messaging device 200 can be powered on and able to communicate wirelessly with other linked messaging devices 200 forming their own intranet. Linked messaging devices 200 properly positioned or sequenced can collectively create a continuous LED display (between multiple messaging devices 200) by having visual messages such as images and animations move among multiple linked messaging devices 200. The messaging devices 200 need not be touching each other in this example. For example, two people walking down the street can each have one messaging device 200 on an armband, and the two messaging devices 200 when viewed together (e.g., by a third person) can collectively display a message, with each individual messaging device 200 displaying a portion of the visual message.

In some implementations, the control system 100 of the messaging device 200 can generate and display a visual message on the LED array 125. If the messaging device 200 is connected to an additional electronic device 145, visual messages, such as images or flash sequences generated by an application on that additional electronic device 145 are provided as output to the LED array 125 via direct connection between the additional electronic device 145 and the messaging device 200 (e.g., via the connector 700). Some implementations of the messaging device 200 incorporate WiFi or Bluetooth communication chipsets for pairing or communicating with a host computer, connected electronic device 145, or another messaging device 200 to receive visual messages for display, or to transmit visual messages for display by other messaging devices 200.

In some implementations, the messaging device 200 includes a data storage unit (e.g., memory) 110, 115 to store information about the messaging device 200 such as its state, e.g., ON or LINK. The messaging device 200 can exchange this information with other linked messaging devices 200 as well as applications (e.g., originating from a smartphone) that access the control system 100 API. In one implementation, the messaging device 200 has at least three power or communication states, e.g., OFF or ON or LINKED Logic units of the messaging device 200 such as components of the control system 100 can determine the orientation of the messaging device 200, for example with respect to the ground, using gyroscopic sensors 135. In one implementation, a connected or encased supplemental device (e.g., smartphone) can communicate gyroscopic sensor data to the control system 100 of the messaging device 200 regarding orientation. The gyroscopic sensors 135 can also be included in the messaging device 200 and communicate with the processor 120 of the messaging device 200 to determine the position or orientation of the messaging device 200.

In some implementations, by interpreting gyroscopic and proximity sensor data either from a connected or encased device or the messaging device 200 itself, the messaging device 200 communicates its position relative to other linked messaging devices 200 via WiFi or Bluetooth wireless communication. For example, each linked messaging device 200 in the intranet or other networked connection can be assigned a position on a virtual X-Y plane. Positions can be reassigned as linked messaging devices 200 are moved around or added into the virtual plane. This can preserve the continuity of a scrolling message or animation traversing across displays. The control system 100 of one or more messaging devices 200 can determine the ends of the virtual display and scrolls properly, for example from right to left, to appear as a ticker to the viewer. In another example, at least one control system 100 controls a visual message such as a racecar animation to start, accelerate, and end across the series of LED arrays 125 of more than one messaging device 200 in the correct order.

In one implementation, the control unit 105 of one messaging device 200 synchronizes display of the visual message, or portions thereof by communicating with at least one other messaging device 200 via a local area network communication. For example, the control unit 105 can detect a second messaging device 200, and can provide at least a portion of the visual message to the second messaging device for display by the second messaging device. In some implementations, the control unit 105, via the interface 140, can receive at least part of the visual message from another messaging device or from another source such as a smartphone or other computing device, including a cloud based server, laptop or desktop computer, tablet, or server operating in a data center. The received visual message can be provided by the control unit 105 to the LED array 125 for display, e.g., from the outer surface of the display panel 300.

In one implementation, the control unit 105 of at least one messaging device 200 can detect other messaging devices 200, for example via wireless communication within a range of tens of meters. The control unit 105 can determine a hierarchy of the detected messaging devices 200, for example passed on their geographic location or orientation, and via at least one interface 140, can communicate with the detected messaging devices 200 to provide data notifying the control units 105 of the other messaging devices 200 of the hierarchy. For example, the hierarchy may identify an order in which multiple messaging devices 200 are to display a visual message, for example in a scrolling manner where the visual message appears to run across multiple LED arrays of multiple messaging devices 200.

The LED array 125 can have single color, multi color, or full color ranges, and the direction and speed of a scrolling visual image can vary or be adjusted mid-display by at least one control system 100. Animation continuity of visual messages can be maintained between the linked messaging devices 200. In one implementation, at least one control system 100 controls each visual image (or each portion of one visual image) to move across the LED array(s) 125 at a constant speed that is communicated to other linked messaging devices 200 and maintained across the intranet or other networked connection of linked messaging devices 200. In one implementation, the interface 140, which can include a communication interface to communicate via a local (or other) area network with other messaging devices 200, can provide a portion of a visual message to one or more different messaging devices 200 including the messaging device 200 that includes the interface 140.

In one implementation, the control systems 100 of the messaging devices 200 linked in their own intranet or local or personal area network have a master-drone relationship. For example, text animations (visual images) can move right to left across the LED arrays 125. In this example, the position of the master messaging device 200 and control system 100 can be the rightmost messaging device 200 relative to the viewer. Once all messaging devices 200 in the intranet (or generally all linked messaging devices 200) are positioned, the master control system 100 or the drone control systems 100 can determine the total number of linked messaging devices 200, can determine the position of their respective messaging devices 200 relative to the viewer and can determine in what order the animation (visual message) will move across the LED arrays 125 of respective messaging devices 200.

The messaging devices 200 can include ROM (read only memory) 110 that can be accessed by the control unit 105 to identify the messaging device model and LED array 125 characteristics. In some implementations, a messaging device 200 may have a limited feature set compared to other messaging devices 200 in a linked network or intranet. By communicating that data to the master control system 100 and the drone control systems 100 in the intranet or other linked network, animation across those messaging devices 200 can be skipped or adjusted. In one implementation, the user of those limited messaging devices 200 can be alerted to those restriction(s) by the messaging device 200 or by an associated smartphone or other additional electronic device 145.

The messaging device 200 can have various display resolutions. The control system 100 of the messaging device 200 can determine the number of LEDs 305 on its LED array 125 (e.g., its display) and the spacing between them. In one implementation, image previews of the visual message can be seen though an application on a connected electronic device 145 (e.g., smartphone). Should a visual message image animation cross between messaging devices 200 with different resolutions, at least one control system 100 (e.g., the master, or the control system of the messaging device with the different resolution) can adjust the output to the effected messaging device 200 to maintain continuity of the visual message (e.g., the flash sequence) with the previous and subsequent linked LED displays 125 of other messaging devices 200. The diodes 305 in the LED array 125 can emit light with a particular luminous intensity. However in some implementations some diodes may be able to dim. The luminous intensity information can be relayed via control systems 100 or associated electronic devices 145 throughout the sequence of connected messaging devices 200.

Some visual messages may be sent by at least one control system 100 to be output as characters instead of images. This method allows the control system 100 of the messaging device 200 to change font sets without having to redesign a letter image. When characters are output, the messaging device 200 can relay font, character ID, kerning and spacing information to the sequence of connected messaging devices 200.

A USB port or other interface 140 on the messaging device 200 can allow a compatible cable to connect to another device or power source, for example to recharge the messaging device battery 130. When connected via the USB port to an electronic device 145 or computer, the messaging device 200 can be uploaded with visual messages such as flash sequences or can be used as an output device. The messaging device 200 can be wirelessly paired with a music device or directly connected to it via the USB port. Once paired or connected, the buttons (or other user interfaces 140) on the messaging device 200 can be used to control music playback and volume control on the music device. The messaging device 200 could also be configured (via its control system 100 or communication with the control system of an external device) to output information like track title and artist name. The LEDs 305 of the LED array 125 could also be controlled or programmed by a corresponding control system 100 or communication with the control system of an external device to mimic a VU meter as the song played, for example.

Figure 12:
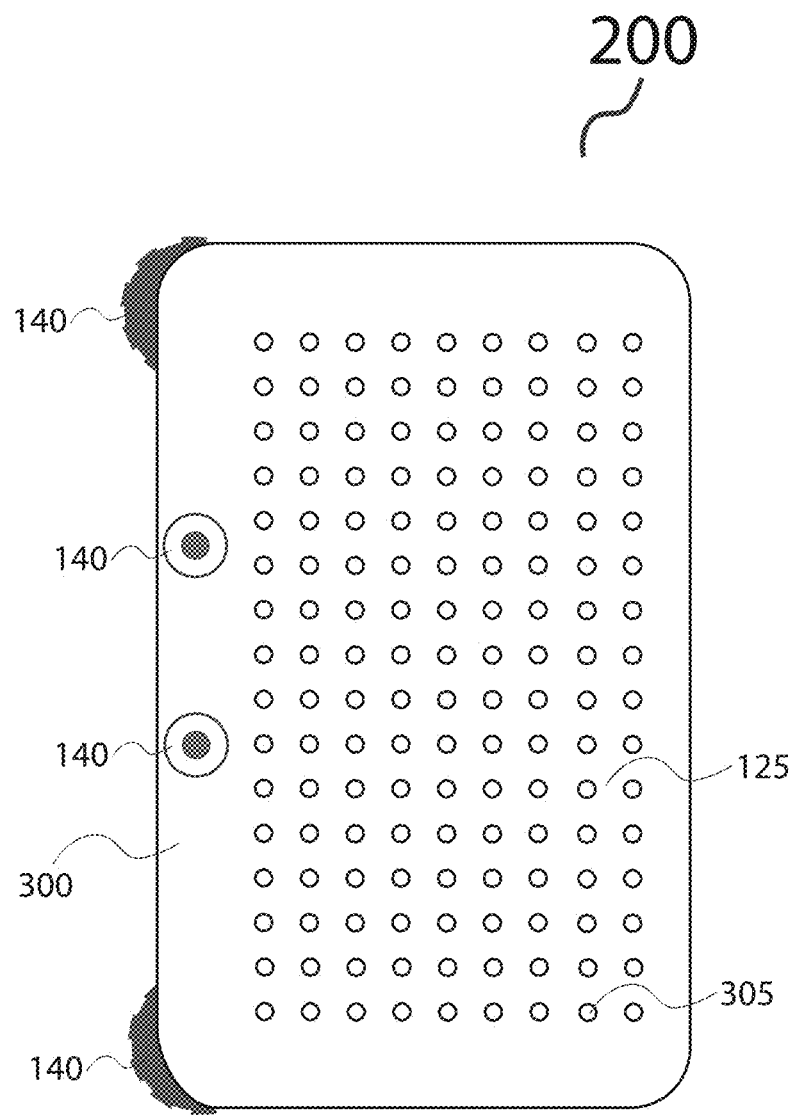
FIG. 12 is a perspective view of an implementation of a portable messaging device.
Figure 13:
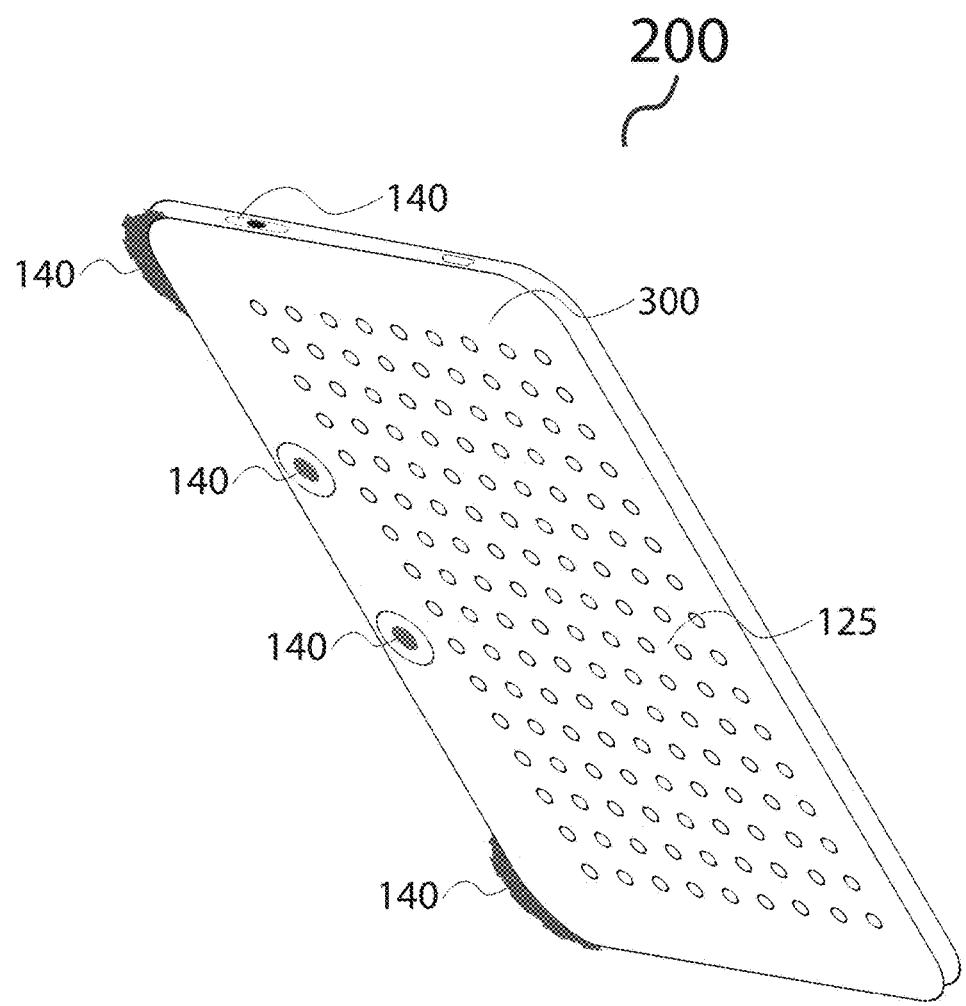
FIG. 13 is a perspective view of an implementation of a portable messaging device.
Figure 14:
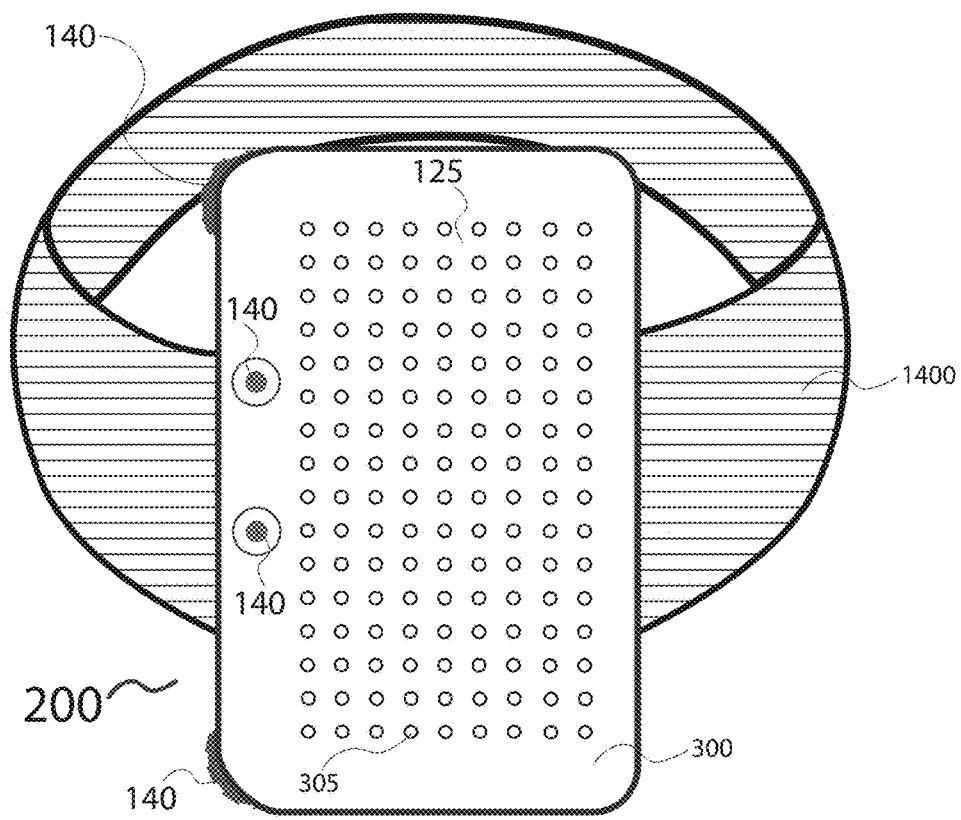
FIG. 14 is a perspective view of an implementation of a portable messaging device in an armband holder.

FIG. 12 and FIG. 13 illustrate example views of the messaging device 200 having interfaces 140 (e.g., knobs, power buttons, actuators, speed control, luminosity control, or state selection). In some implementations, one or more interfaces 140 can be disposed on the display panel 300, for example together with at least one LED array 125. FIG. 14 illustrates an example view of the messaging device 200 attached to an armband 1400. In some implementations, the messaging device 200 is carried or worn by a user, and the displayed image (e.g., flash sequence) from the LED array 125 is intended for another person who is not the carrier. While the primary viewer of a messaging device display in this example is not its carrier, the messaging device 200 may display information necessary for the carrier. Flash sequences displayed by the LED array 125 can, for example, display to the carrier its preference settings or status.

With reference to FIG. 14, among others, in some implementations, the messaging device 200 is incorporated to fit into the armband 1400, for example to send an illuminated message or flash sequence from the display panel 300 that includes the LED array 125 that attracts the attention of passersby. For example, for a person that exercises outdoors at dusk or in the evening, the LED flash pattern of the messaging device 200 can serve to call out his or her presence to nearby runners, bikers, or vehicle operators. The messaging device 200 can have a form factor that allows it to slide into a pocket of the armband 1400. The form factor of the messaging device 200, for example, can be a rectangular flattened bar with repositioned controls to one side. Button, dial, and switch locations of the interfaces 140 of the messaging device 200 in an armband implementation can be optimized for an active person who needs easy access to controls while performing their activity, such as running. The controls (e.g., interfaces 140) can be positioned one side of the messaging device to allow one-hand operation of the messaging device 200 by a person wearing the messaging device on their arm with an armband. In one implementation, the messaging device 200 is configured for disposal in the armband 1400 with the display panel 300 facing outward from the armband when a user wears the armband 1400, so that passers-by can see the visual message.

For example, spectators at a sporting event normally might bring a cardboard sign preprinted or drawn with a single message that cheers on their team. With the messaging device 200 in hand, carriers can generate messages on the fly, for example reacting to a play on the field, or cheering on their favorite player. When several fans place their messaging devices 200 together, their message seen across their connected displays 125 appears longer to a larger crowd within visual range of the messaging devices. Because of the intense luminosity of the messaging device display 125, the message its carrier(s) generate(s) can be seen by more viewers (e.g., fans) than a traditional cardboard sign. In another example, friends or family cheering for runners in a road race or walkers at a charity walk usually communicate with each other with cheers, noisemakers, or drawn signs. A sideline spectator or fan that is carrying his or her messaging device 200 can send a message to a participant on the course via a single messaging device display 125 or via multiple displays aligned contiguously. In this example, the runner or walker can also display a message to the crowd. For example, where a runner in a marathon might draw a message like "Go Pat!" on their shirt or arm, the messaging device 200 worn in an armband 1400 can generate the same continuous scrolling message. Unlike a drawn message, the messaging device 200 can also animate the visual image of a runner as part of a flash sequence on the display. The messaging device 200 can also display the participant's overall or lap time to the spectators, for example.

In one example, a person wandering in a poorly lit outdoor environment can get lost or separated from their group. While a mobile phone may be able to help the lost person contact someone, illumination from the display 125 of the mobile phone may be insufficient to alert a searcher to the person's presence. In this example the LED array/display 125 on the messaging device 200 can emit more and brighter light than the mobile phone, or more consistent light than even the camera flash of a mobile phone. As a result, the illuminated messaging device LED array can be seen at greater distances and sharper angles. For example, a flash pattern may also convey messages to alert members of a hiking party, e.g., by displaying messages like "Go left" or "Bear nearby!" The messaging device LED array 125 can display messages to others, e.g., those within visual range of at least one wearer or carrier of the messaging device 200. In one implementation, the messaging device's battery 130 is configured to provide power solely to the messaging device and its LED array. In other implementations the battery 130 can charge additional devices as well.

In one implementation, for example when the messaging device 200 is configured for disposal in the armband 1400, the messaging device does not include the recessed area 705 and is not configured as a case to accommodate another electronic device 145. For example, the control system 100 can communicate wirelessly with other computing devices that are not in physical contact with the messaging device 200 to obtain visual messages for display by the display panel 300. The control system can also obtain visual messages from the data storage units 110, 115 to display by the display panel 300 without, or in the absence of, wireless communication with other electronic devices 145. In one implementation, the messaging device can be physically connected to other electronic devices 145 without housing them in the recessed area 705, for example via a cable connection to a desktop computer or smartphone, to download visual message data corresponding to visual messages. The downloaded data can be stored in the data storage unit 115, for example. The data storage unit can also include a buffer or cache to temporarily store visual messages received from another messaging device 200 or another electronic device 145.

Figure 15:
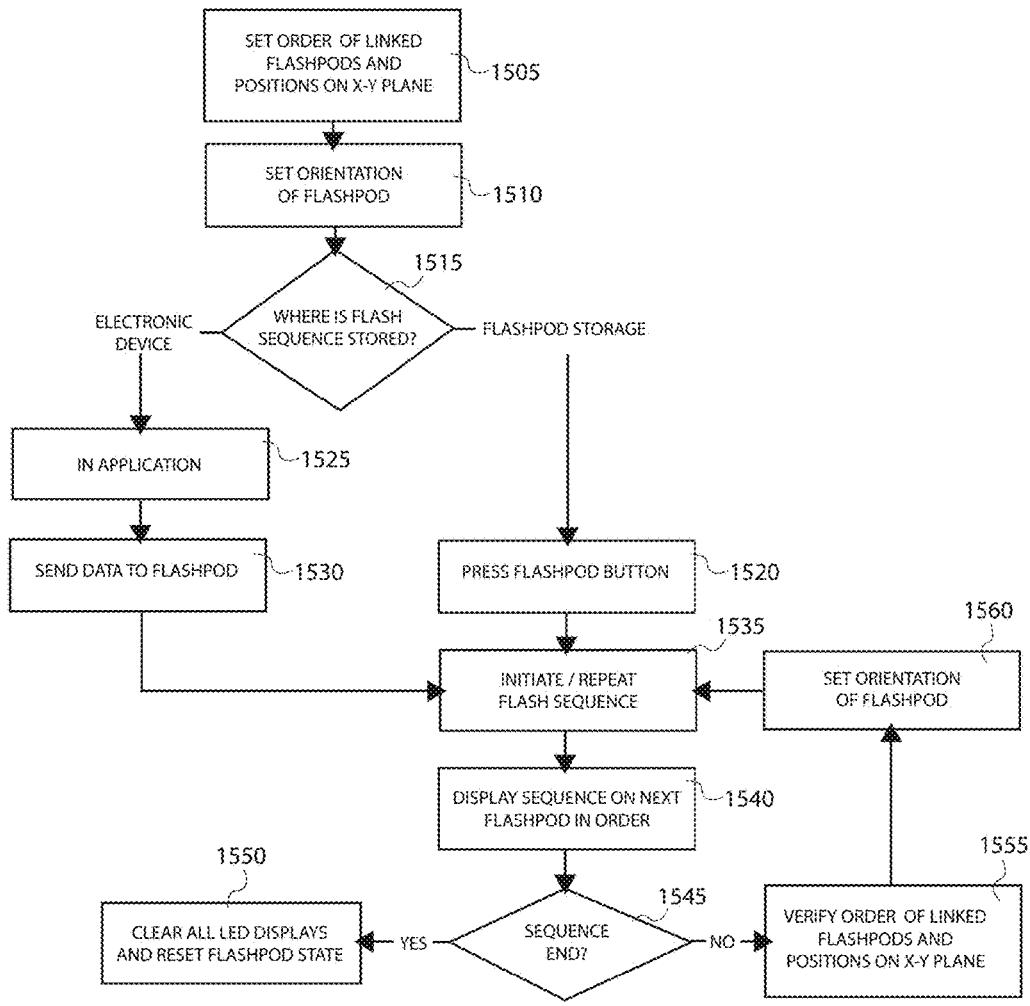
FIG. 15 is a flow diagram depicting portable messaging device communication in accordance with an implementation.

Referring for example to FIG. 10 and FIG. 11, where a visual message can be communicated across multiple messaging devices 200, FIG. 15 illustrates an example flow diagram 1140 for multiple messaging device communication. With reference to one or more control systems 100 and logic units of corresponding electronic devices 145 (e.g., smartphone or other computing device, the order of linked Flashpod messaging devices 200 can be set (1505), with orientation positions on an X-Y plane identified (1510). A determination (1515) of where a flash sequence is stored can be made. The flash sequence can be stored with the electronic device or in memory of the messaging device. In one example, the flash sequence is stored in a messaging device, and an interface of the messaging device is actuated (1520). In another example, an application (1525) of another computing device is executed to send data to the messaging device (1530). In either of these two examples, the flash sequence can be initiated or repeated (1535) across LED displays of at least one messaging device. The sequence can be displayed in order across more than one messaging device, e.g., from right to left (1540). A determination can be made (e.g., by at least one messaging device) that the sequence has or has not ended (1545). When it is determined that the sequence has ended, the LED displays of at least one messaging device can be cleared and the messaging device state can be reset (1550). When it is determined that the sequence has not ended, the order or positioning of linked messaging devices can be verified (e.g., on the X-Y plane) (1555). The orientation of the messaging devices can be reset (1560) and the flash sequence can initiate, repeat, or continue (1535).

In some implementations, the messaging device 200 can display visual messages as well as communicate with additional messaging devices via a local area network, including for example a personal area network or intranet. The portable messaging device 200 can include at least one display panel 300 having an inner surface 715 and an outer surface 300. The display panel 300 can include the LED array 125, for example facing outward from the outer surface 300 to display visual messages. In some implementations, the first lateral side wall 215, the second lateral side wall 220, and the display panel 300 of the messaging device 200 define at least part of the recessed area 705 that can accommodate a smartphone or other electronic device 145 in an example where the messaging device 200 functions as a case. The messaging device 200 can also include a control unit 105 that can communicate with the display panel 300.

The messaging device 200 can also include at least one lid 205. The first end 740 of the lid can pivot with respect to an edge of the first lateral side wall 215, e.g., during opening and closing of the lid, and the second end 745 of the lid can contact an edge of the second lateral side wall 220, e.g., with the lid in a closed position. The messaging device 200 can also include at least one connector disposed in an inner wall 720 of the base panel 250 to connect with electronic devices 145 disposed in the recessed area 705.

In some implementations, the messaging device 200 includes one LED array 125 on a back panel (e.g., the outer surface of the display panel 300), and at least one other LED array 125 on a different surface of the messaging device, such as the outer surface 230 of the first lateral side wall 215 or the outer surface 240 of the second side wall 220, or an outer surface of the base panel 250. In one implementation, the control unit 105 accesses visual message data corresponding to the visual message from at least one data storage unit 110, 115, of the messaging device 200. This data can also be obtained by the control unit 105 from a data storage unit that is external to the messaging device 200. In one implementation, the control unit 105 can communicate with a processing or other logic unit of another electronic device 145 to select the visual message from a data storage unit of the electronic device 145, via the electronic device 145 from another data storage unit that is not part of the electronic device 145, such as a server in communication with the electronic device 145 via a mobile phone communication network or an Internet connection.

Figure 16:
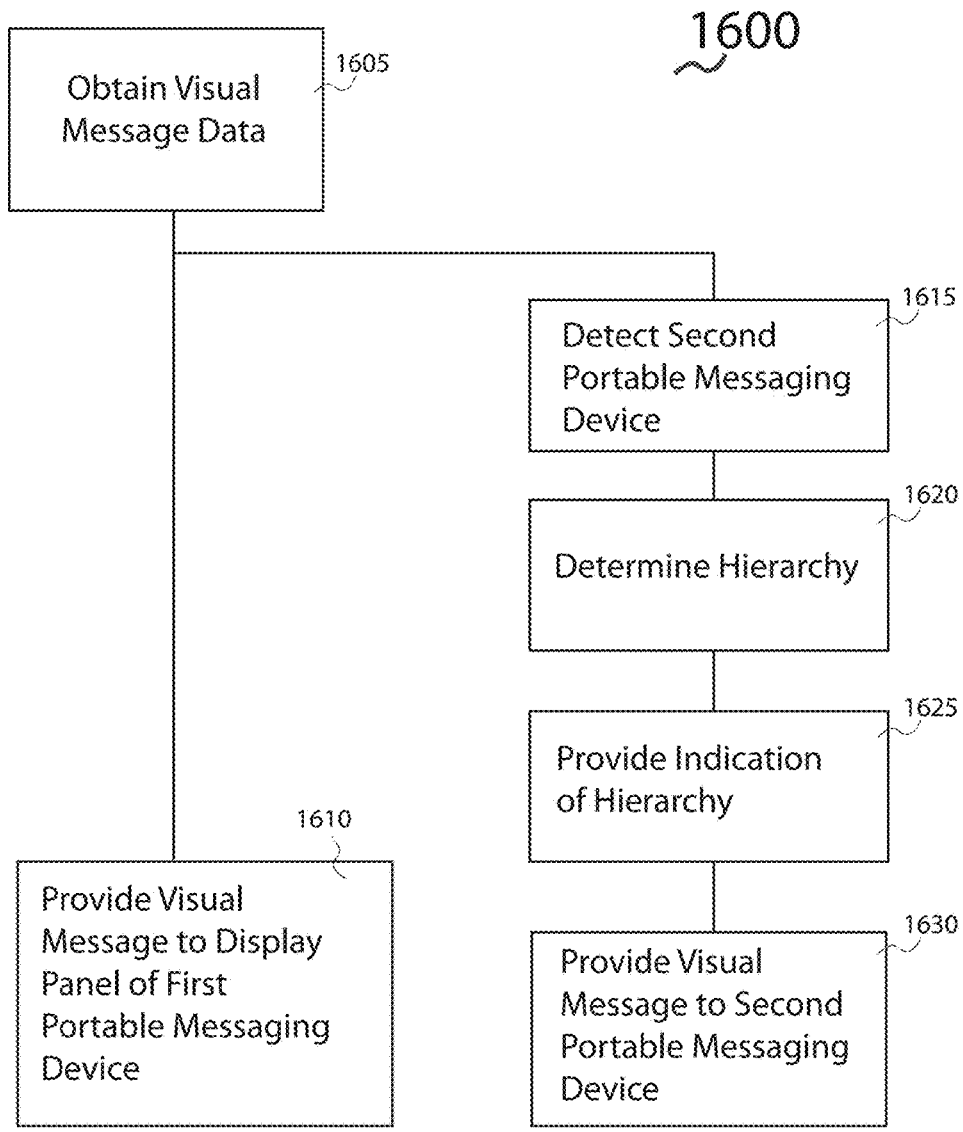
FIG. 16 is a flow diagram depicting a method of displaying visual messages on at least one portable messaging device in accordance with an implementation.

FIG. 16 is a flow diagram depicting a method 1600 of displaying visual messages on at least one portable messaging device 200 in accordance with an implementation. The method 1600 can obtain visual message data (1605). For example, the control system 100 (or components thereof) can obtain visual message data from the data storage units 110, 115, of one or more messaging devices 200, or from additional electronic devices via a wired or wireless computer network communication.

The method 1600 can provide visual messages for display (1610). For example, the control system 100 can provide at least a portion of a visual message to the LED array 125 for display by the messaging device 200. In one implementation, the method 1600 detects a second messaging device (1615). For example, an interface 140 of one messaging device 200 can detect another messaging device 200 within a range of tens of meters via Bluetooth or other wireless communication protocols. In some implementations, the method 1600 determines a hierarchy between multiple detected messaging devices (1620). For example, the control system 100 of one or more messaging device 200 can determine the locations of multiple messaging devices 200 and based on the locations, the control system can identify an order the messaging devices 200 in which to display a static (e.g., still) or dynamic (e.g., scrolling) visual message across more than one messaging device 200.

As part of the method 1600, for example, the control system 100 can provide an indication of this order, or hierarchy, to control systems 100 of at least one other messaging device 200 that has been detected or that forms part of the group of messaging devices 200 that collectively display the visual message (1625). The method 1600 can also provide at least part of the visual message to the second portable messaging device (1630). For example, the control unit 105 can provide at least part of the visual message from a corresponding data storage unit 110, 115 to a second messaging device 200 via wireless communication between messaging devices 200.

With general reference to FIG. 1, the control system 100 can include the general architecture of a computer system that may be employed to implement the operations discussed herein. The control system 100 can be used to operate the messaging device 200 of which it is a part as well as additional messaging devices 200. The control system 100 can include one or more processors 120 communicatively coupled to data storage units 110, 115, one or more power supplies 130, one or more sensors 135, one or more interfaces 140, one or more LED arrays 125 (or other displays), and one or more electronic devices 145.

In the control system 100, the data storage units 110, 115 may include any computer-readable storage media, including non-transient and tangible storage media, and may store computer instructions such as processor-executable instructions for implementing the various functionalities described herein for respective systems, as well as any data relating thereto, generated thereby, or received via the communications interface 140. Referring to the control system 100, the control unit 105 can include the memory data storage units 110, 115 to store visual messages (e.g., visual message data), as well as the information used to determine hierarchies between multiple messaging devices 200 or to detect multiple messaging devices 200. The processor 120 can execute instructions stored in the data storage units 110, 115 and can read from or write to the data storage units 110, 115 information processed and or generated pursuant to execution of the instructions.

The processor 120 can be communicatively coupled to or control the communications interface 140 to transmit or receive various information pursuant to execution of instructions. For example, the communications interface 140 may be coupled to a wired or wireless network, bus, or other communication means and may therefore allow the control system 100 to transmit information to or receive information from other messaging devices 200 or from electronic devices 145 (e.g., other computer systems). The interfaces 140 can facilitate information flow between the components of the control system 100. In some implementations, the communications interface 140 can (e.g., via hardware components or software components) provide a website as an access portal to access visual messages from electronic devices 145.

The interface 140 can allow information (visual messages or instructions regarding hierarchy determinations) to be transmitted, received, viewed or otherwise perceived in connection with execution of instructions. The interface 140 may be provided, for example, to allow a user to make manual adjustments, make selections, enter data or other information, or interact in any of a variety of manners with the processor during execution of the instructions.

Implementations of the subject matter and the operations described in this specification can be implemented at least in part by one or more control systems 100 in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus" or "computing device" "computer" "module" "electronic device" or "computing device" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The control unit 105 or its components can include or share one or more data processing apparatuses, computing devices, or processors.

A computer program (also known as a program, software, software application, script, or code) can be written in a programming language and deployed as a stand-alone program or as a module, component, subroutine, object, or other unit suitable for use in a computing environment. A computer program may, but need not, correspond to a file in a file system. A computer program can be deployed to be executed on one messaging device 200 or on multiple computers that are located at one site or distributed across multiple sites and interconnected by a communication network. A computer program can be executed by the control unit 105 or its components.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of a digital computer. Generally, a processor can receive instructions and data from a read-only memory or a random access memory or both. The elements of a computer include a processor for performing actions in accordance with instructions and one or more memory devices for storing instructions and data. Generally, a computer can also include, or be operatively coupled to receive data from or transfer data to, one or more mass storage devices for storing data, e.g., magnetic, magneto-optical disks, or optical disks. However, a computer need not have such devices. Moreover, a computer can be embedded in another device, e.g., the messaging device, a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device of the LED array 125 or another display device, e.g., a CRT (cathode ray tube), plasma, or LCD (liquid crystal display) monitor, for displaying visual messages. Interfaces 140 can provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending or receiving data from the messaging device 200.

The control system 100 can include clients and servers, (e.g., masters and drones). A client and server are generally remote from each other and typically interact through a communication network. The relationship of client and server arises by virtue of computer programs running on the respective computers and having a client-server relationship to each other. In some implementations, a server transmits data to a client device (e.g., for purposes of receiving or displaying visual messages).

The implementation details described herein should not be construed as limitations on the scope of what may be claimed, but rather as descriptions of features specific to particular implementations of the systems and methods described herein. Certain features that are described in this specification in the context of separate implementations can also be implemented in combination in a single embodiment or implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

While operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing by one or more control systems 100 may be advantageous. Moreover, the separation of various system components in the implementations described above should not be understood as requiring such separation in all implementations, and it should be understood that the described program components and systems can generally be integrated together in a single software product or packaged into multiple software products. For example, control system 100 can be a single module or a logic device having one or more processing circuits.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference identifiers nor their absence have any limiting effect on the scope of any claim elements.

The systems and methods described herein may be embodied in other specific forms without departing from the characteristics thereof. For example, in addition or as an alternative to LED arrays 125, other displays such as monitors, plasma screens, or LCD displays can display the visual messages on one or more messaging devices. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A portable messaging device configured to display visual messages and communicate with additional messaging devices via a local area network, the portable messaging device comprising:
    a display panel having an inner surface and an outer surface, the display panel including an LED array;
    a control unit configured to communicate with the display panel;
    a first lateral side wall and a second lateral side wall, the first lateral side wall and the second lateral side wall, and the inner surface of the display panel configured to define at least part of a recessed opening;
    a lid having a first end and a second end, the first end of the lid configured to pivot with respect to the first lateral side wall and the second end of the lid configured to contact an edge of the second lateral side wall;
    a connector disposed in an inner wall of the recessed opening, wherein the connector faces into the recessed opening; and
    the control unit configured to receive input via a user interface of the portable messaging device and, responsive to the input, provide a visual message to the LED array for display from the outer surface of the display panel.

2. The portable messaging device of claim 1, wherein the display panel including the LED array is a back panel of the portable messaging device, further comprising:
    a second LED array disposed on an outer surface of one of the first lateral side wall and the second lateral side wall; and
    the control unit configured to communicate with the second LED array to display one of the visual message and a second visual message.

3. The portable messaging device of claim 1, further comprising:
    a data storage unit; and
    the control unit configured to access visual message data corresponding to the visual message from the data storage unit and provide the visual message to the LED array for display by the LED array.

4. The portable messaging device of claim 1, wherein the user interface includes a mechanical interface, further comprising:
    the mechanical interface coupled to an outer surface of one of the first lateral side wall and the second lateral side wall, the mechanical interface configured to rotate responsive to user input; and
    the control unit configured to provide the visual message for display by the LED array responsive to actuation of the mechanical interface.

5. The portable messaging device of claim 1, wherein the recessed opening is configured to accommodate an electronic device, further comprising:
    an opening in one of the lid, the display panel, the first lateral side wall and the second lateral side wall, the opening configured to align with one of an interface of the electronic device and a camera lens of the electronic device; and
    the connector configured to couple with a connector of the electronic device.

6. The portable messaging device of claim 1, wherein the recessed opening is configured to accommodate an electronic device, further comprising:
    the control unit configured to communicate with a processing unit of the electronic device to select the visual message from a data storage unit of the electronic device.

7. The portable messaging device of claim 1, wherein the portable messaging device is a first portable messaging device, further comprising:
    a communication interface configured to communicate via the local area network with a second portable messaging device to provide a first portion of the visual message for display by the LED of the first portable messaging device, and to provide a second portion of the visual message for display by the second portable messaging device.

8. The portable messaging device of claim 1, further comprising:
    the control unit configured to scroll the visual message across the LED array.

9. The portable messaging device of claim 1, wherein the portable messaging device is a first portable messaging device, further comprising:
    the control unit configured to synchronize display of at least a portion of the visual message by the first portable messaging device and a second portable messaging device at least in part by communicating with the second portable messaging device via the local area network.

10. The portable messaging device of claim 1, wherein the portable messaging device is a first portable messaging device, further comprising:
the control unit configured to detect a second portable messaging device; and
the control unit configured to provide at least a portion of the visual message to the second portable messaging device.

11. The portable messaging device of claim 1, wherein the portable messaging device is a first computing device, further comprising:
the control unit configured to receive at least a portion of the visual message via a wireless communication from a second computing device.

12. The portable messaging device of claim 1, wherein the portable messaging device is a first portable messaging device and the visual message is a first visual message, further comprising:
the control unit configured to receive at least a portion of a second visual message via a wireless communication from a second portable messaging device for display by the LED array.

13. The portable messaging device of claim 1, wherein the portable messaging device is a first portable messaging device of a plurality of portable messaging devices, further comprising:
the control unit configured to detect the plurality of user portable messaging devices;
the control unit configured to determine a hierarchy of the plurality of user portable messaging devices; and
via the communication interface, the control unit configured to communicate with each of the plurality of portable messaging devices to notify each of the plurality of portable messaging devices of a position in the hierarchy.

14. The portable messaging device of claim 1, wherein the portable messaging device is a first portable messaging device further comprising at least one of:
a gyroscopic sensor and a proximity sensor; and
the control unit configured to communicate with at least one of the gyroscopic sensor and the proximity sensor to determine a spatial orientation of the first portable messaging device relative to at least one of a second portable messaging device, geographic coordinates, a ground surface, a horizon, and a second electronic device.

15. The portable messaging device of claim 1, wherein the LED array is a first LED array and the display panel including the first LED array is a back panel of the portable messaging device, further comprising:
a second LED array disposed on an outer surface of one of the first lateral side wall and the second lateral side wall; and
the control unit configured to communicate with the second LED array to display the visual message on the first LED array and to display a derivative of the visual message on the second LED array.

16. The portable messaging device of claim 1, wherein the LED array is a first LED array and the display panel including the first LED array is a back panel of the portable messaging device, further comprising:
a second LED array disposed on an outer surface of one of the first lateral side wall and the second lateral side wall; and
the control unit configured to communicate with the second LED array to display the visual message on both the first LED array and the second LED array.

17. A method of displaying visual messages on a portable messaging device, the portable messaging device configured to display the visual messages and communicate with additional messaging devices via a local area network, the portable messaging device comprising:
a first lateral side wall and a second lateral side wall, the first lateral side wall and the second lateral side wall configured to define at least part of a recessed opening to house a portable electronic device;
a display panel including an LED array, an inner surface of the display panel forming a back panel configured to define at least part of the recessed opening to house the portable electronic device, and an outer surface of the display panel configured with the LED array to display the visual messages;
a control unit configured to communicate with the display panel and a data storage unit; and
a user interface configured to receive input and communicate with the control unit to provide a visual message to the LED array for display from the outer surface of the display panel;
the method comprising:
obtaining, by the control unit, visual message data corresponding to the visual message from one of the data storage unit of the portable messaging device and communication via the local area network with a computing device; and
providing at least a portion of the visual message data to the display panel to cause the LED array to display the visual message.

18. The method of claim 17, wherein the portable messaging device is a first portable messaging device, further comprising:
detecting a second portable messaging device;
determining a hierarchy between the first portable messaging device and the second portable messaging device;
providing an indication of the hierarchy from the first portable messaging device to the second portable messaging device; and
providing at least a portion of the visual message data to the second portable messaging device.

19. A portable messaging device configured to display visual messages and communicate with additional messaging devices via a local area network, the portable messaging device comprising:
a display panel including an LED array;
a data storage unit configured to store at least a portion of visual message data corresponding to a visual message;
a control unit configured to communicate with the display panel and the data storage unit;
a power source coupled with the control unit, the power source configured to provide power to the control unit and the display panel;
a first lateral side wall and a second lateral side wall, the first lateral side wall and the second lateral side wall and an inner surface of the display panel defining at least part of a recessed opening;
a connector disposed in the recessed opening to interface with a connector of an electronic device and to communicate with a control system of the electronic device;

a user interface configured to receive input and communicate with the control unit to provide the visual message to the LED array for display; and a communication interface configured to communicate with a second portable messaging device via the local area network to provide at least a portion of the visual message to the second portable messaging device for display by the second portable messaging device.

20. The portable messaging device of claim 19, wherein the portion of the visual message is a first portion, and the portable messaging device is a first portable messaging device, further comprising:

the control unit configured to determine a hierarchy between the portable messaging device and the second portable messaging device;

the control unit configured to provide an indication of the hierarchy to the second portable messaging device;

the control unit configured to provide the first portion of the visual message data to the second portable messaging device for display by the second portable messaging device and to provide a second portion of the visual message for simultaneous display by the LED array of the first portable messaging device.

* * * * *